US011472550B2

(12) United States Patent
Smith et al.

(10) Patent No.: US 11,472,550 B2
(45) Date of Patent: *Oct. 18, 2022

(54) CLOSE PROXIMITY COUNTERMEASURES FOR NEUTRALIZING TARGET AERIAL VEHICLES

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/151,296

(22) Filed: Oct. 3, 2018

(65) Prior Publication Data

US 2020/0108924 A1  Apr. 9, 2020

(51) Int. Cl.
*B64C 39/02* (2006.01)
*F41H 13/00* (2006.01)
(Continued)

(52) U.S. Cl.
CPC .......... *B64C 39/024* (2013.01); *B64C 27/006* (2013.01); *B64D 1/00* (2013.01);
(Continued)

(58) Field of Classification Search
CPC ............... B64C 39/02; B64C 29/0025; B64C 39/024; G05D 1/12; G05D 1/00; G05D 1/0094;
(Continued)

(56) References Cited

U.S. PATENT DOCUMENTS 4,240,601 A   12/1980  Reed
6,119,976 A    9/2000  Rogers
(Continued)

FOREIGN PATENT DOCUMENTS

DE   102015003323 A1   9/2016
FR       2965908 A1   4/2012
(Continued)

OTHER PUBLICATIONS

Airspace Systems Inc.; "Airspace LV"; Vimeo [online] [video]; vimeo.com; (Apr. 5, 2017); 2 pages; [retrieved on Oct. 2, 2018]; Retrieved from <URL: https://vimeo.com/211704482?from=outro-embed >.

(Continued)

*Primary Examiner* — Yuri Kan

(57) ABSTRACT

A system for detecting and neutralizing a target aerial vehicle comprises a counter-attack unmanned aerial vehicle (UAV) comprising a flight body and a flight control system supported about the flight body operable to facilitate flight of the UAV, and an aerial vehicle countermeasure supported by the flight body. The system can comprise an aerial vehicle detection system comprising at least one detection sensor operable to detect a target aerial vehicle while in-flight, and operable to provide command data to the counter-attack UAV to facilitate interception of the target aerial vehicle by the counter-attack UAV. Upon interception of the target aerial vehicle, the counter-attack UAV is operable to disrupt operation of the detected target aerial vehicle with the aerial vehicle capture countermeasure, thereby neutralizing the target aerial vehicle. The counter-attack UAV and systems may be autonomously operated. Associated systems and methods are provided.

58 Claims, 11 Drawing Sheets

(51) Int. Cl.
*G05D 1/00* (2006.01)
*B64D 47/08* (2006.01)
*B64D 3/00* (2006.01)
*B64C 27/00* (2006.01)
*B64D 1/00* (2006.01)

(52) U.S. Cl.
CPC ............ *B64D 3/00* (2013.01); *B64D 47/08* (2013.01); *F41H 13/0006* (2013.01); *F41H 13/0043* (2013.01); *G05D 1/0094* (2013.01); *B64C 2201/108* (2013.01); *B64C 2201/12* (2013.01); *B64C 2201/141* (2013.01); *B64C 2201/206* (2013.01)

(58) Field of Classification Search
CPC ........... G05D 1/101; F42B 12/36; B60Q 1/08; G08G 5/00; A63B 67/00; B64F 1/02; F41H 13/0006; B64D 1/02; B64D 47/04
See application file for complete search history.

(56) References Cited

U.S. PATENT DOCUMENTS

| | | | |
|---|---|---|---|
| 6,392,213 | B1 | 5/2002 | Martorana et al. |
| 8,146,855 | B2 | 4/2012 | Ismailov |
| 9,085,362 | B1 | 7/2015 | Kilian et al. |
| 9,789,950 | B1 | 10/2017 | Most et al. |
| 10,040,554 | B1 | 8/2018 | Weinstein et al. |
| 10,364,026 | B1* | 7/2019 | Hanlon ................. B64C 39/022 |
| 10,384,772 | B2* | 8/2019 | Hada .................. B64C 29/0025 |
| 10,663,266 | B2 | 5/2020 | Banga et al. |
| 10,689,109 | B2 | 6/2020 | Wypyszynski et al. |
| 10,926,875 | B2 | 2/2021 | Klein |
| 2009/0114761 | A1 | 5/2009 | Sells, II |
| 2009/0212157 | A1 | 8/2009 | Arlton et al. |
| 2010/0181424 | A1 | 7/2010 | Goossen et al. |
| 2012/0216697 | A1* | 8/2012 | Jacobsen ............... F41B 9/0046 102/439 |
| 2014/0183300 | A1 | 7/2014 | MacCulloch et al. |
| 2015/0360797 | A1 | 12/2015 | Melish et al. |
| 2016/0023760 | A1* | 1/2016 | Goodrich ................ B64C 11/48 244/10 |
| 2016/0117932 | A1* | 4/2016 | Park ..................... G05D 1/0202 701/3 |
| 2016/0250535 | A1* | 9/2016 | Yatsko ................... A63B 67/00 |
| 2016/0251088 | A1 | 9/2016 | Melish et al. |
| 2016/0293015 | A1 | 10/2016 | Bragin |
| 2016/0376029 | A1 | 12/2016 | Sekiya |
| 2017/0057635 | A1 | 3/2017 | Strayer |
| 2017/0059692 | A1 | 3/2017 | Laufer et al. |
| 2017/0144756 | A1 | 5/2017 | Rastgaar Aagaah et al. |
| 2017/0205820 | A1 | 7/2017 | Liu |
| 2017/0225784 | A1 | 8/2017 | Hayes et al. |
| 2017/0253348 | A1 | 9/2017 | Ashdown et al. |
| 2017/0261292 | A1 | 9/2017 | Armstrong et al. |
| 2017/0261604 | A1 | 9/2017 | Van Voorst |
| 2017/0291704 | A1 | 10/2017 | Alegria |
| 2017/0355461 | A1 | 12/2017 | Naito et al. |
| 2017/0356726 | A1 | 12/2017 | Theiss et al. |
| 2017/0369169 | A1 | 12/2017 | Lee et al. |
| 2018/0162529 | A1 | 6/2018 | Klein |
| 2018/0162530 | A1 | 6/2018 | Klein |
| 2018/0164080 | A1 | 6/2018 | Chi-Hsueh |
| 2018/0197420 | A1 | 7/2018 | Banga |
| 2018/0224262 | A1 | 8/2018 | Klein |
| 2018/0237161 | A1 | 8/2018 | Minnick et al. |
| 2018/0244401 | A1 | 8/2018 | Kilian et al. |
| 2018/0257780 | A1 | 9/2018 | Sassinsky |
| 2018/0335779 | A1* | 11/2018 | Fisher ................. F41H 13/0006 |
| 2019/0025858 | A1* | 1/2019 | Bar-Nahum ......... G08G 5/0013 |
| 2019/0063881 | A1 | 2/2019 | Abramov et al. |
| 2019/0068953 | A1 | 2/2019 | Choi et al. |
| 2019/0100315 | A1 | 4/2019 | Theiss |
| 2019/0112045 | A1 | 4/2019 | Zhang |
| 2019/0129427 | A1 | 5/2019 | Sugaki et al. |
| 2019/0176684 | A1* | 6/2019 | Zych ..................... B60Q 1/085 |
| 2019/0176986 | A1* | 6/2019 | Addonisio ............ B64C 39/024 |
| 2019/0346241 | A1 | 11/2019 | Metz et al. |
| 2020/0108922 | A1* | 4/2020 | Smith .................... G05D 1/101 |
| 2020/0108923 | A1* | 4/2020 | Smith .................. G05D 1/0094 |
| 2020/0108925 | A1* | 4/2020 | Smith .................. B64C 39/024 |
| 2020/0108926 | A1* | 4/2020 | Smith ..................... F41H 11/02 |
| 2021/0188435 | A1* | 6/2021 | Smith .................. G05D 1/0094 |

FOREIGN PATENT DOCUMENTS

| | | |
|---|---|---|
| KR | 10-2015-0145786 | 12/2015 |
| KR | 10-2017-0079782 | 7/2017 |
| WO | WO 2018/016017 A1 | 1/2018 |
| WO | WO 2018/112281 A1 | 6/2018 |

OTHER PUBLICATIONS

Airspace Systems, Inc.; "Airspace"; airspace.co; (2016); 4 pages; [retrieved on Oct. 2, 2018]; Retrieved from <URL: http://airspace.co/#technology >.

Atherton; "This Drone Fires Nets to Catch Other Drones"; Popular Science; (Apr. 5, 2016); [retrieved on Oct. 2, 2018]; Retrieved from <URL: https://www.popsci.com/drone-fires-nets-to-catch-other-drones >.

Dedrone; "Dedrone Videos"; dedrone.com; (2018); 3 pages; [retrieved on Oct. 2, 2018]; Retrieved from <URL: https://www.dedrone.com/products/videos >.

Fortem Technologies; "Fortem DroneHunter™ Demonstration"; YouTube [online] [video]; YouTube.com; (Sep. 24, 2017); 1 page; [retrieved on Oct. 2, 2018]; Retrieved from <URL: https://www.youtube.com/embed/BsFXLPFzK-4 >.

Groupe Assmann; "Drone Interception"; YouTube [online] [video]; YouTube.com; (Dec. 12, 2014); 2 pages; [retrieved on Oct. 2, 2018]; Retrieved from <URL: https://youtu.be/APWG3VEGbJw >.

Moseman; "This Drone Interceptor Captures Your Pathetic Puny Drone With a Net"; Popular Mechanics; (Feb. 11, 2015); 6 pages; [retrieved on Oct. 2, 2018]; Retrieved from <URL: http://www.popularmechanics.com/flight/drones/a14032/france-dispatches-a-net-carrying-bully-drone-to-catch/ >.

Openworks Engineering Ltd.; "SkyWall"; Openworks Engineering; [brochure]; (2017); 15 pages; <URL: https://openworksengineering.com/skywall >.

Starrs; "To Catch a Drone, Use a Net"; The Washington Post (WP Company LLC); (Jan. 15, 2016); 3 pages; [retrieved on Oct. 2, 2018]; Retrieved from <URL: https://www.washingtonpost.com/news/morning-mix/wp/2016/01/15/watch-a-drone-catcher-net-a-rogue-drone/?utm_term=63257596ca17 >.

International Search Report for International Application No. PCT/US2019/054552 dated Jan. 13, 2020, 20 pages.

International Search Report for International Application No. PCT/US2019/054541 dated Jan. 14, 2020, 18 pages.

International Search Report for International Application No. PCT/US2019/054537 dated Jul. 16, 2020, 22 pages.

International Search Report for International Application No. PCT/US2019/054545 dated Jul. 24, 2020, 24 pages.

International Search Report for International Application No. PCT/US2019/054547 dated Jul. 24, 2020, 23 pages.

* cited by examiner

CLOSE PROXIMITY COUNTERMEASURES FOR NEUTRALIZING TARGET AERIAL VEHICLES

BACKGROUND

Unmanned aerial vehicles (UAVs), such as multi-rotor drones, fixed-wing drones, and tilt rotor drones, have become increasingly popular in the past decade. This popularity, coupled with their constantly improving performance capabilities, pose threats in terms of collisions with other aerial vehicles or structures, whether accidental or deliberate. More serious threats are also becoming more of a realization and possibility, such as terrorist attacks on high-value targets, such as government complexes, international airports, nuclear or other power plants, petrochemical facilities, water reservoirs, sporting events, and other highly-populated or critical infrastructure or locations. Factors that contribute to such threats are the high rate of speed of drones, their small signature, the possibility of simultaneous, coordinated attacks from a number of attacking drones, their ability to carry increasingly large payloads, and others. These factors are exacerbated by the fact that drones are relatively inexpensive, easy to acquire, highly portable, and highly maneuverable. Moreover, consumer drones are dramatically improving in terms of endurance, range, and payload transport capabilities (e.g., some consumer drones can carry up to 50 lbs., with other more expensive and advanced drones being able to carry up to 400 pounds), which is enough to carry significant amounts of explosives, projectiles, biological, and/or chemical weapons). In many cases, a drone operated for a deliberate attack can be launched and flown into a protected perimeter within just a few seconds, which leaves minimal time to detect and neutralize the attacking drone.

With all these considerations in mind, one or more inexpensive adversarial drones can be autonomously or manually flown into a protected area while potentially causing a large amount of damage and/or harm, all at a very low cost and effort by a programmer/operator. Counteracting such threats with existing technologies can be very costly and complex, particularly when trying to protect a relatively large airspace associated with hundreds of acres or square kilometers of a property.

SUMMARY OF THE INVENTION

In one example, the present disclosure sets forth a system for detecting and neutralizing a target aerial vehicle comprising a counter-attack unmanned aerial vehicle (UAV), which can comprise: a flight body; a flight control system flight body that controls flight of the counter-attack UAV; and an aerial vehicle countermeasure supported by the flight body. The system can comprise an aerial vehicle detection system comprising at least one detection sensor operable to detect a target aerial vehicle, and that is operable to provide command data to the counter-attack UAV to facilitate interception of the target aerial vehicle by the counter-attack UAV. In response to interception of the target aerial vehicle, the counter-attack UAV disrupts operation of the detected target aerial vehicle with the aerial vehicle capture countermeasure.

In one example, the command data comprises at least one of intercept data, aerial vehicle countermeasure deployment command data, target aerial vehicle detection data, counter-attack UAV control data, or a combination thereof.

In one example, the aerial vehicle detection system comprises an on-board aerial vehicle detection system comprising at least one sensor configured to detect a position of the target aerial vehicle. The flight control system can comprise a flight controller operable to control autonomous flight of the counter-attack UAV based on the detected position of the target aerial vehicle.

In one example, the aerial vehicle detection system comprises an external aerial vehicle detection system comprising at least one detection sensor operable to detect the target aerial vehicle and to provide command data to the counter-attack UAV to facilitate interception of the target aerial vehicle.

In one example, the external aerial vehicle detection system is associated with a ground-based structure to monitor an airspace. The at least one detection sensor comprises a plurality of detection sensors configured to detect a plurality of target aerial vehicles.

The present disclosure sets forth a method for neutralizing a target aerial vehicle comprising: detecting a target aerial vehicle with at least one detection sensor of an aerial vehicle detection system; transmitting command data, associated with the detected target aerial vehicle, to a counter-attack UAV; operating the counter-attack UAV to intercept the target aerial vehicle; and operating an aerial vehicle countermeasure supported by the counter-attack UAV to interrupt operation of the target aerial vehicle when the counter-attack UAV is in close proximity to the target aerial vehicle.

In one example, the method further comprises detecting a position of the target aerial vehicle with at least one detection sensor of the counter-attack UAV.

In one example, the method further comprises actuating a release mechanism to release the aerial vehicle capture countermeasure and the captured target aerial vehicle at a particular location.

In one example, detecting the target aerial vehicle further comprises operating a plurality of detection sensors associated with a ground structure to generate position data associated with the target aerial vehicle. The method further comprises continuously communicating the position data to the counter-attack UAV.

In one example, detecting the target aerial vehicle further comprises operating a plurality of detection sensors to generate position data associated with the target aerial vehicle. The method further comprises eliminating position data associated with one or more detection sensors based on a credibility hierarchy associated with the plurality of detection sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

To further describe the present technology, examples are now provided with reference to the figures.

Figure 1:
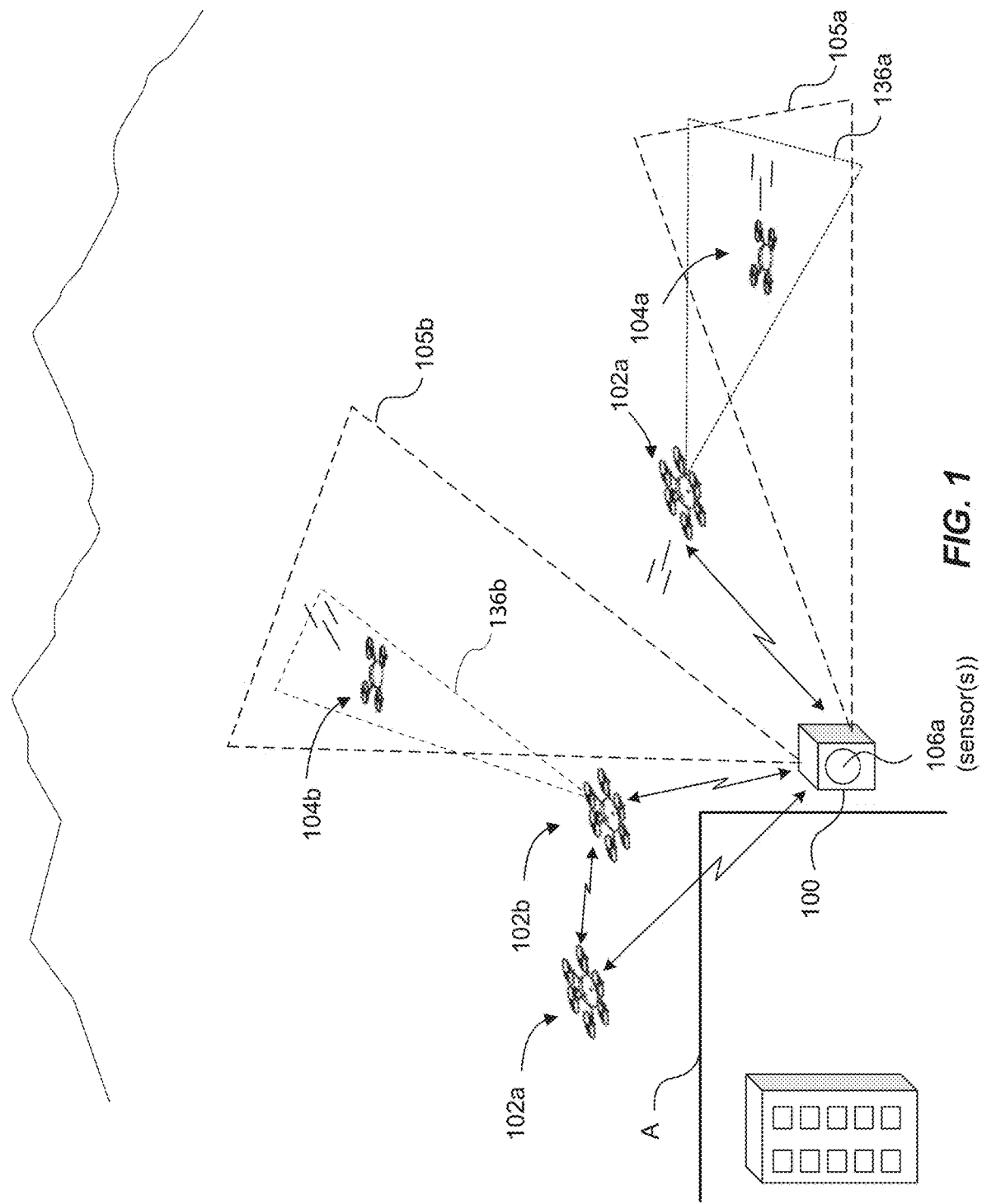
FIG. 1 is an illustration that graphically and schematically shows a system for detecting and neutralizing target aerial vehicle(s) with a counter-attack UAV in accordance with an example of the present disclosure.
Figure 2:
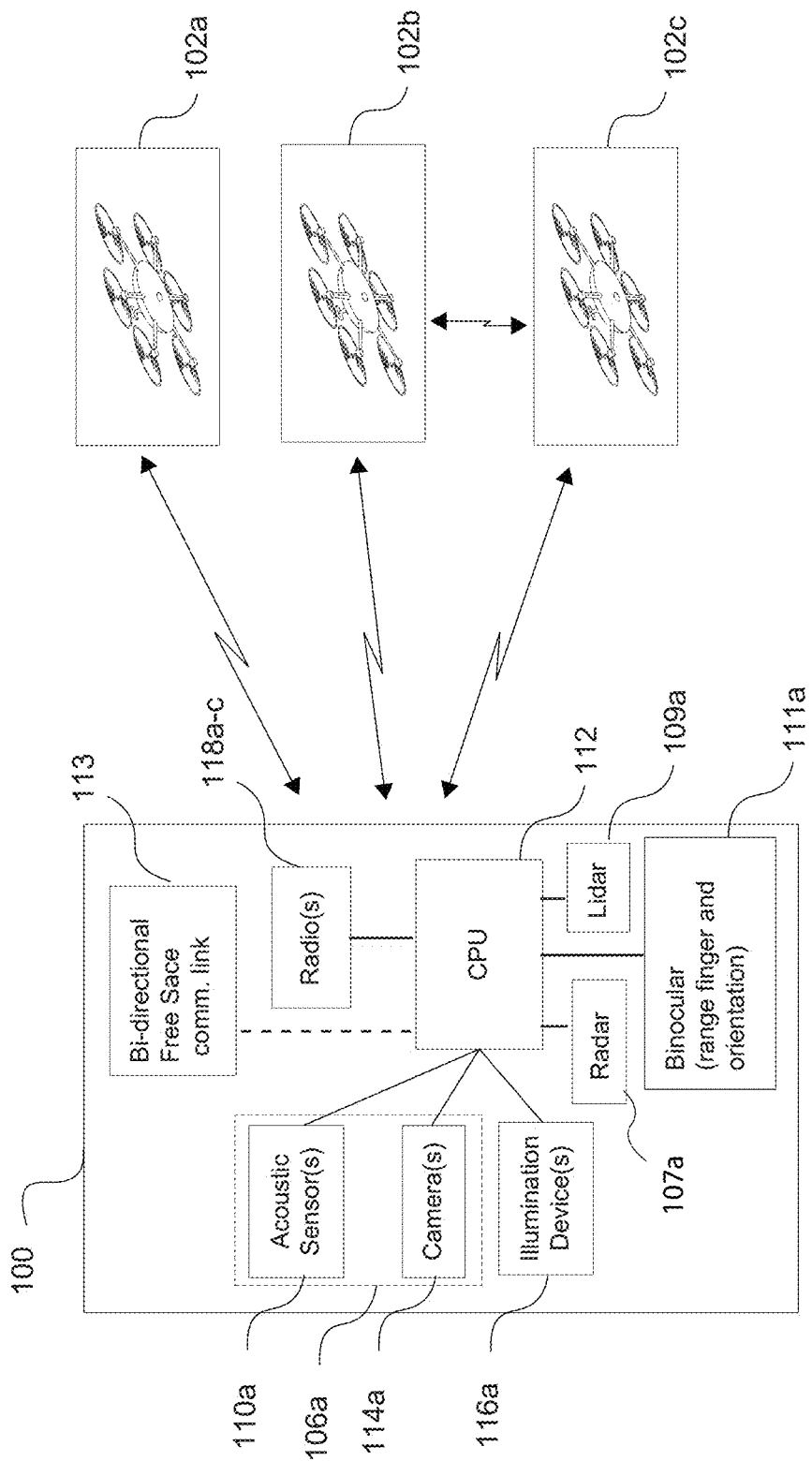
FIG. 2 is a block diagram that illustrates possible detection and communication features of the system of FIG. 1 in accordance with an example of the present disclosure.
Figure 3:
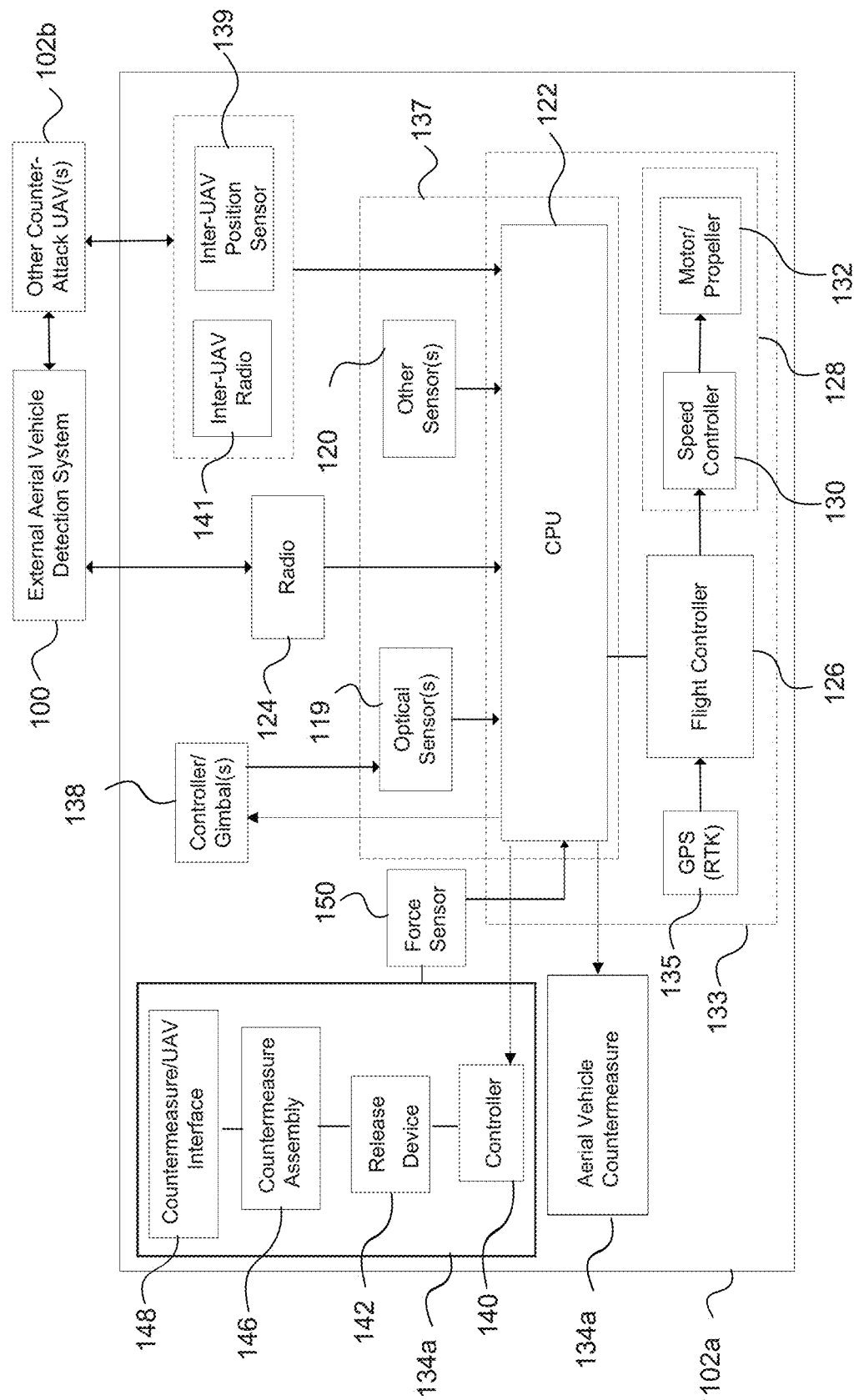
FIG. 3 is a block diagram that illustrates possible detection and operation features of any one of the counter-attack UAVs of FIG. 1 in accordance with an example of the present disclosure.

FIG. 1 schematically and graphically illustrates a system and method for protecting an airspace area A with an external aerial vehicle detection system 100 and one or more counter-attack UAV(s), such as example UAVs 102a-c. The external aerial vehicle detection system 100 can be configured to communicate with the counter-attack UAV(s) 102a-c for the purpose of neutralizing one or more target aerial vehicle(s) (e.g., see target aerial vehicles 104a and 104b) that may be encroaching or approaching the airspace area A, and that are determined to be a threat to the airspace area A. FIG. 2 is a block diagram that illustrates the components of the external aerial vehicle detection system 100 and its ability to perform detecting and real-time tracking of the target aerial vehicle(s) 104a and/or 104b, and to communicate command data to the counter-attack UAV(s) 102a-c. The command data can include any data relevant to facilitate capture of the target UAV, including, but not limited to, data pertaining to the location of the target UAV. And, FIG. 3 is a block diagram that illustrates a control system of an individual counter-attack UAV (e.g., any one of 102a-c) for neutralizing the target aerial vehicle(s) 104a and/or 104b, and how the control system is operable with the external aerial vehicle detection system 100 and other counter attack UAVs 102.

As an overview, and in one example, the system of FIG. 1 can comprise the external aerial vehicle detection system 100 configured to detect incoming target aerial vehicles 104a and 104b that may be a threat to infrastructure and/or assets within the airspace area A (e.g., buildings, commercial airplanes, utilities, personnel). The external aerial vehicle detection system 100 can be configured to obtain and communicate information about the detected target aerial vehicles 104a and 104b, such as their tracked position(s) periodically over time or in real-time, their altitude, their trajectory, their velocities, and any other sensed or acquired information pertaining to the target aerial vehicles 104a and 104b. Once obtained, this information can be communicated to the counter-attack UAV(s) 102a-c, so that the counter-attack UAV(s) 102a-c can intercept and neutralize the respective target aerial vehicle(s) 104a and 104b, as further detailed below. The target aerial vehicles 104a and 104b can comprise any type of aerial vehicle, such as, but not limited to, unmanned single or multi-rotor UAVs or fixed-wing UAVs (or tilt rotor UAVs) that can be operated autonomously or manually. Alternatively, the target aerial vehicles 104a and 104b can be manned vehicles, such as a manned helicopter, manned propeller airplane, or other manned aerial vehicles. As mentioned, target aerial vehicles 104a and 104b (e.g., multi-rotor UAVs) can be significant threats because they can ascend/descend vertically up to several kilometers in airspace, can hover for many minutes, are extremely agile, fast, and maneuverable around obstacles, have small visual/IR/radar signatures, and can transport substantial payloads. Therefore, quickly detecting and tracking their positions and velocities within a relatively short timeframe (e.g., a few seconds) is critical to effectively prevent breach of the airspace area A, and more importantly to protect assets associated with the monitored airspace area A.

To "intercept" can mean that a counter-attack UAV, such as counter-attack UAV 102a (and/or 102b, 102c) is flown into a position relative to a target aerial vehicle (for example, target aerial vehicle 104a) that permits the counter-attack UAV 102a to perform a countermeasure, such as a neutralizing function, with respect to the target aerial vehicle 104a. This can include, but is not limited to, flying the counter-attack UAV 102a into a projected flight path of the target aerial vehicle 104a, or along a flightpath offset from, but proximate the target aerial vehicle 104a, or to a position proximate the target aerial vehicle 104a, or along a flightpath behind the target aerial vehicle 104a, or along any other flight path or to any position where the counter-attack UAV 102a is in close proximity to the target aerial vehicle 104a.

The external aerial vehicle detection system 100 can be supported by or associated with a ground-based structure, a vehicle (e.g., land, sea, or air), a movable platform, or other platform that can support a number of components discussed herein as associated with the external aerial vehicle detection system 100. The external aerial vehicle detection system 100 can comprise a number of sensors or platforms spaced apart from each other around an area or about different structures, and that can each be communicatively coupled to each other and/or a central computer system for controlling gimbals, for pointing positions, for processing data associated with target aerial vehicle(s), and for communicating command data to one or more counter-attack UAVs. Note that a plurality of aerial vehicle detection systems (e.g., 100) can be incorporated around an area to protect a larger airspace, and which can each have a computer system communicatively coupled to the computer systems of the other aerial vehicle detection systems to cooperatively monitor and protect a given airspace.

As more particularly shown in FIG. 2, the external aerial vehicle detection system 100 can comprise at least one detection sensor 106a (where, although not shown, up to n (any) number of detection sensors are contemplated, as will be appreciated by those skilled in the art) operable to collect and generate data associated with the target aerial vehicles(s) 104a and 104b (e.g., velocity, geolocation, altitude, trajectory or flight path, and others). For example, the detection sensor(s) 106 can comprise one or more acoustic sensor(s), such as acoustic sensor 110, and one or more camera(s), such as camera 114 that are operable to collect and generate data associated with the target aerial vehicle(s) 104a and 104b. The detection sensor(s) 106a can comprise other target acquisition assets, such as radar device(s) 107a, LIDAR device(s) 109a, and/or binocular(s) 111a, each coupled to a CPU 112 and having the capability to measure azimuth elevation/tilt angle of a target aerial vehicle. The detection sensor(s) 106a can further comprise other sensors, such as electromagnetic signature sensors used to detect a target aerial vehicle prior to taking-off, or cameras operating over a different portion of the electromagnetic spectrum from LWIR to SWIR to visible. Other possible sensors include narrow band light emitters with detectors (e.g., cameras) that have their detection band closely matched to those of the light emitters, and/or other sensors, such as narrow band light emitters (e.g., UV sources) that may make portion the target fluoresce in a different portion of the electromagnetic spectrum facilitating its detection. Note that the detection sensor(s) 106 may be able to detect multiple target aerial vehicles at the same time, wherein the CPU 112 (or multiple CPUs) can be configured to determine which sensor(s) is/are most credible or reliable for target aerial vehicle(s), and then configured to assign one or more of such sensor(s) to continue to track and monitor the target aerial vehicle(s) while un-assigning other sensor(s) from tracking particular target aerial vehicle(s). This concept is further discussed below regarding the "credibility hierarchy".

In some examples, the acoustic sensor(s) 110 can comprise one or more microphones that can detect and track target aerial vehicle(s) 104a and 104b at a large distance (e.g., up to 500 meters, or more). A database of UAV signatures can be obtained or built and accessed by a CPU 112 of the aerial vehicle detection system 100 to determine the existence and type of the detected target aerial vehicle(s) 104a and 104b. In this manner, the CPU 112, utilizing a processor, can eliminate or ignore the signatures of any (friendly) counter-attack UAV(s) 102a-c that may be in-flight while detecting the signatures of target aerial vehicle(s) 104a and 104b (assuming the "friendly" and "enemy" UAVs are different types of UAVs, or assuming the CPU 112 is programmed to differentiate between the two, such as based on known positions of counter-attack UAVs).

In some examples, one or more sensor(s) or camera(s) 114 (e.g., IR, optical, CCD, CMOS) can be incorporated as one or more of the detection sensors 106 of the external aerial vehicle detection system 100. For instance, infrared (IR) camera(s) can be implemented into the system and directed toward a particular airspace for viewing possible incoming target aerial vehicles. IR cameras are useful in this system because they can assist to overcome environmental problems experienced by other sensors (e.g., optical cameras), because IR cameras can operate in the dark or in foggy, dusty, or hazy conditions. IR cameras utilized in this system have the additional advantage that the IR signal from a target aerial vehicle (e.g., a UAV) is very different from that of birds in-flight. IR cameras based on the shortwave infrared (SWIR) spectrum can interact with objects in a similar manner as visible wavelengths, as it is reflective, bouncing-off objects. As a result, SWIR light has shadows and contrast in its imagery. Images from a SWIR camera are comparable to visible images in resolution and detail. An atmospheric phenomenon called night sky radiance or night glow emits five to seven times more illumination than starlight, nearly all of it in the SWIR wavelengths. Because of this, SWIR cameras can see objects with great clarity on moonless nights. Such SWIR camera(s) can be incorporated into the present external aerial vehicle detection system 100 (and/or into the counter-attack UAV(s)). Longwave infrared (LWIR) cameras are more optimal for outdoor use because they are less affected by radiation from the Sun than with SWIR cameras. As such, LWIR camera(s) can be incorporated into the external aerial vehicle detection system 100 to benefit from the advantages of outdoor use to detect and track target aerial vehicle(s). Other camera(s), such as optical cameras (e.g., HD, 4K), can also be incorporated as detection sensor(s) 106a of the external aerial vehicle detection system 100 to assist with detection and tracking the position of target aerial vehicle(s) 104a and 104b.

In some examples, one or more telephoto lenses can be operable and incorporated with one or more of the SWIR and LWIR camera(s), and/or optical camera(s), and can be mounted on high-resolution motorized gimbals (e.g., 2 or 3-axis gimbals) associated with the external aerial vehicle detection system 100 to assist with detecting and tracking the position(s) of target aerial vehicle(s) 104a and 104b, including the angular position and/or azimuth elevation, in some cases depending on the type of sensor employed. Two or more detection sensors described herein can be used to compute range of a target aerial vehicle. Moreover, a particular camera (e.g., IR, optical) can be used in conjunction with an on-board (or remotely supported) laser range finder to determine the position of the target aerial vehicle in three-dimensional space (e.g., distance, azimuth angle, and elevation angle). Such telephoto lenses and gimbals can each be operated to establish the pointing position (and to dynamically modify the pointing position) of the associated camera, and therefore adjust a field-of-view (FOV) 105a (FIG. 1), for instance, of a particular camera. These telephoto lenses and gimbals can be operated manually or autonomously (discussed below) to continuously track a dynamic flight position or path of a particular target aerial vehicle. In one example, a 360-degree camera device (having IR or optical camera(s)) could also be integrated with the external aerial vehicle detection system 100 to monitor an entire 360-degree air space, which may or may not require a gimbal for operation to monitor such airspace.

Computer vision algorithms stored and processed by the CPU 112 of the external aerial vehicle detection system 100 can be implemented for automatic detection and tracking of the target aerial vehicle(s) 104a and 104b. Such computer vision algorithms can "pull" a moving object out of a static background and classify it by shape (i.e., feature detection). Other mechanisms for classification of target aerial vehicle(s) 104a and 104b include using neural networks, which are computer algorithms designed to mimic the workings of the human brain, that are trained to recognize known/stored images of profiles that may be similar to the particular detected target aerial vehicle(s) 104a and 104b. Those skilled in the art will recognize that various known algorithms can be implemented to achieve this functionality, including "convolutional neural network" (CNN) combined with fast detection, such as provided by the You Only Look Once (YOLO) detection architecture known in the industry. Once the target aerial vehicle(s) are detected by the computer vision system (e.g., CNN, YOLO), the gimbal orientation supporting the camera can be used to determine azimuthal and elevation of the target aerial vehicle. Information from multiple computer vision systems may be combined to calculate range in addition to azimuthal and elevation angle. The target classification and position information collected using the computer vision system can further be combined/fused with information collected from other sensor(s) (e.g., 106a) to increase the likelihood of detection, and/or accuracy of classification of the target aerial vehicle, and/or tracking of the position of the target aerial vehicle.

In some examples, Phase-Based Video Motion processing technology can be incorporated with the external aerial vehicle detection system 100 (e.g., software processed by the CPU 112). Phase-Based Video Motion processing technology amplifies very small motions that otherwise could not be detected. This technology is further described in U.S. Patent Pub. No. US20170000356A1 filed Jul. 1, 2015, which is incorporated by reference herein. Thus, small vibration motions inherent to target aerial vehicles (e.g., UAVs) can be detected, which can overcome the issues with using only cameras to detect and track target aerial vehicles. For instance, as similarly discussed in U.S. Patent Pub. No. US20170000356A1, a method executed by a processor (e.g., CPU 112) receives a video as input (e.g., video of a target aerial vehicle) and exaggerates subtle changes and micromotions. To amplify motion, the method does not perform feature tracking or optical flow computation, but merely magnifies temporal changes using spatio-temporal processing. This Eulerian based method, which temporally processes pixels in a fixed spatial region, reveals informative signals and amplifies small motions in real-world videos. The Eulerian-based method begins by examining pixel values of two or more images. The method then determines (with the processor) the temporal variations of the examined pixel values. The method is designed to amplify only small temporal variations. While the method can be applied to large temporal variations, the advantage in the method is provided for small temporal variations, such as when a target aerial vehicle is detected at long ranges. Therefore, the method can be optimized when the input video has small temporal variations between the images of a particular target aerial vehicle while in flight. The method can then apply signal processing to the pixel values. For example, signal processing can amplify the determined temporal variations, even when the temporal variations are small, such as vibrations of a target aerial vehicle as captured in successive images by an optical sensor of an external vehicle detection system of the present disclosure.

Once the target aerial vehicle(s) 104a and 104b have been identified in successive frames of video (e.g., using IR and/or 4K optical cameras, and/or other sensors such as Radar), autonomously tracking a dynamic flight position or path of the target aerial vehicle(s) 104a and 104b and fusing position information provided by different sensing methodology (e.g., camera and Radar) can be performed by utilizing a Kalman filter, extended Kalman filter, particle filters, or another variation of a Bayesian filter. These filters work by taking an estimate of the velocity, position, and orientation of the particular target aerial vehicle 104a, for instance, and then predicting where the target aerial vehicle 104a will be in the next frame of video. Then, the position of the target aerial vehicle 104a in the next video frame is compared with the predicted position, and the estimates for the velocity, position, and orientation are updated. During such tracking with one of the cameras 114a, a feedback control loop can autonomously and continually adjust the gimbal (supporting the particular camera) to keep the target aerial vehicle 104a centered about the FOV 105a of the camera of the external aerial vehicle detection system 100. This facilitates or maintains continuous tracking of a dynamic flight position of a particular target aerial vehicle. Common algorithms include centroid tracking, edge detection, feature-based algorithms, and area correlation tracking. Using this system of cameras and filters, the external aerial vehicle detection system 100 can detect and track, in real-time, a flight position or path of a particular target aerial vehicle.

Indeed, a number of detection sensors 106 can be positioned about a structure or platform of the external aerial vehicle detection system 100 in a manner that the detection sensors 106 can cooperatively and collectively monitor a perimeter of up to 360 degrees associated with an airspace around the position of the external aerial vehicle detection system 100 to protect an area (e.g., a 500+m radius of coverage of an airspace). Alternatively, the detection sensors 106 can be mounted and configured to point toward a particular area of interest less than 360 degrees of coverage, such as through a canyon, or other particular egress of importance relative to the protected area A.

In some examples, the external aerial vehicle detection system 100 can comprise at least one illumination device (see illumination device 116), such as a laser or high-powered LED, operable to illuminate the detected target aerial vehicle 104a (while continuously tracking the target aerial vehicle 104a, as detailed above). A particular illumination device 116 can be mounted on a gimbal device (e.g., 3-axis) that is operable to modify a pointing position or direction of the illumination device to continuously direct the illumination device toward the target aerial vehicle 104a for constant illumination. In this manner, a controller (operatively coupled to the CPU 112) can be operated to control said pointing position based on the tracked position or flight path of the target aerial vehicle 104a. As will be discussed below, the counter-attack UAVs 102a-c can have a band pass filter (on a camera) to detect only the narrow frequency band of light illuminated onto the target aerial vehicle 104a by the illumination device 116 of the external aerial vehicle detection system 100.

In another example of a detection sensor of the external aerial vehicle detection system (100), a telescope or a pair of human use binoculars equipped with azimuthal and elevation angle sensors may be used to locate a potential target aerial vehicle and transmit partial position information to the counter-attack UAV(s) (and/or to a CPU of the external aerial vehicle detection system). In another example the telescope or binocular based detection system can be equipped with a range sensor, such as a laser range finder, and the information provided by this range sensor can be combined with that provided by the azimuthal and elevation angle sensors thereby allowing the position of the target UAV to be tracked in 3D.

Once the target aerial vehicle 104a (for instance) is detected as entering a monitored airspace (e.g., within a 500 m radius of the external aerial vehicle detection system 100), the external aerial vehicle detection system 100 can transmit command data to the counter-attack UAV 102a for purposes of neutralizing the target aerial vehicle 104a with an aerial vehicle countermeasure 134a (see e.g., the diagram of FIG. 3, and also the examples of FIGS. 4-11). Prior to receiving such command data, the counter-attack UAV(s) 102a-c may be in a grounded position at virtually any position(s) around the area A, as long as they are within a range of communication with the external aerial vehicle detection system 100. The command data can be generated by the CPU 112 and transmitted via radios 118a-c to the counter-attack UAV(s) 102a-c. Optionally, a bi-directional free space communication link 113 can be utilized in replacement of (or to supplement) radios 118a-c. The command data can include location data, and can be associated with the detected position(s) of the target aerial vehicle(s) 104a and 104b, and the command data can include data pertaining to a flight path, altitude, longitude, latitude, GPS coordinates (degrees, minutes, seconds), and/or other data associated with a geo-location and/or flight path of a particular target aerial vehicle. The command data can also include intercept data, such as information or instructions that command one or more counter-attack UAV(s) 102a-c to fly at a certain velocity and direction to intercept the detected target aerial vehicle.

The command data transmitted to the counter-attack UAV by the external aerial vehicle detection system 100 can also include aerial vehicle countermeasure deployment command data, such as information or instructions that instruct or command the counter-attack UAV(s) 102a-c to deploy or operate a particular aerial vehicle countermeasure at a particular location and time, for instance. The command data can further include target aerial vehicle detection data, such as position data or information (discussed above), and even information other than position information, such as identification information about the type of UAV of the target aerial vehicle(s) detected by the detection sensor(s) 106a. Such information can aid the external aerial vehicle detection system 100 and/or the counter-attack UAV(s) 102a-c to determine the size, type (e.g., fixed or rotary wing), on-board features, and/or performance capabilities of a particular target aerial vehicle, for instance, which can affect the type of countermeasure to be deployed to neutralize the target aerial vehicle (as will be discussed and appreciated from the below discussion).

The command data can also include counter-attack UAV control data, which can include instructions (from the external aerial vehicle detection system 100) for controlling some or all aspects of the counter-attack UAVs 102a-c. In this manner, the counter-attack UAVs 102a-c can be "dummy" drones that have disabled or overridden internal flight controls, so that the external aerial vehicle detection system 100 can control flight, deployment, sensor pointing, etc. Therefore, the external aerial vehicle detection system 100 can detect and monitor the position or flight path of the target aerial vehicle 104b, for instance, with one detection sensor and processing unit, while controlling flight and countermeasure (e.g., net) deployment of the counter-attack UAVs 102b and 102c.

Using at least some of such command data, the counter-attack UAV(s) 102a-c can be guided or directed to be flown toward the position(s) (or predicted position), or within close proximity, of the target aerial vehicle(s) 104a and 104b for interception and neutralization purposes. This system discussed regarding FIGS. 1 and 2 is particularly advantageous in cases where the target aerial vehicle(s) 104a and 104b may be several kilometers away from the airspace area A, and even several kilometers in altitude. This is because it may be difficult for an individual counter-attack UAV to know where to "look" (and which direction to fly) in a plausibly large amount of airspace and at possible long ranges. This is because many on-board cameras of a counter-attack UAV can only detect, identify, and classify targets at larger ranges (e.g., greater than 100 m), if the FOV is significantly reduced (e.g., 10 degrees or less).

As discussed above, the external aerial vehicle detection system 100 can operate the plurality of detection sensors (e.g., two or more of detection sensors 106a) to generate position data associated with a target aerial vehicle. The CPUT 112 can then operate to eliminate position data associated with one or more of the detection sensors based on a credibility hierarchy associated with the plurality of detection sensors. Such credibility hierarchy can be based on environmental conditions. For instance, when operating during daytime and with no clouds, the credibility hierarchy could include position data derived from the following list of prioritized detection sensors: (1) an optical camera, (2) binoculars, (3) IR camera(s), (4) a radar device, (5) a LIDAR device, (6) an acoustic sensor, (7) an illumination device, and (8) other sensors. More specifically, once the CPU 112 has determined or knows of such environmental conditions, the CPU 112 can eliminate position data associated with sensors 3 through 7 (and/or un-assign such sensors from operating), while using position data generated from (1) the optical camera and (2) the binoculars (e.g., assigned detection sensors). Ideally, position data generated from the optical camera(s) would be the most credible during daytime in daylight without clouds, birds, etc. However, if signals generated from (2) the binoculars are more credible for any particular reason (e.g., the binoculars have less intermittent signal loss than the optical camera), then the CPU 112 can eliminate the position data generated from the optical camera, and use the position data generated from the binoculars, and then communicate the position data to one or more counter-attack UAVs. Such processing of eliminating certain position data can occur many times per minute, so that the best tracking information is generated and processed by the external vehicle detection system 100 for transmitting to the counter-attack UAVs, thereby improving or increasing the chances of intercepting and capturing the detected target aerial vehicle(s).

In another example of credibility hierarchy, assume the operating conditions are at night and with cloud cover, such that very little light is emitted to an area to be monitored by the external aerial vehicle detection system 100. Here, the credibility hierarchy may be as follows: (1) IR camera(s), (2) an acoustic sensor, (3) a radar device, (4) a LIDAR device, (5) an illumination device, (6) other sensors, (7) optical camera, and (8) binoculars. This is because at night, IR camera(s) may generate the most credible position data, as discussed above. Thus, the CPU 112 can eliminate position data generated from detection sensors 4 through 8, and then analyze the signals generated from detection sensors 1 through 3 to determine the most credible position data generated. For instance, if the acoustic sensor is getting interference from other sounds, and if the radar device is affected by weather pattern, then the CPU may only use position data from the IR camera(s) as the most credible position data (and only data) for transmitting to the counter-attack UAV(s) to increase the chances of intercepting and capturing the detected target aerial vehicle(s).

It should be appreciated by those skilled in the art that the CPU 112 can include a tangible and non-transitory computer readable medium comprising one or more computer software modules configured to direct one or more processors to perform the method steps and operations described herein.

As illustrated in FIG. 3, a particular counter-attack UAV 102*a* (for instance) can comprise one or more optical sensors (e.g., see optical sensor 119), and/or other detection sensors 120. The optical sensors 119 and the other sensors 120 can be operatively coupled to a CPU 122 for processing data generated by the optical sensors 119 and the other sensors 120 associated with position(s) of the target aerial vehicle(s) 104*a* and 104*b*. The other sensors 120 can comprise one or more of the following: (a) a temperature sensor; (b) a barometer/altimeter; (c) an inertial measurement unit (IMU) (gyro-accelerometer); (d) a compass (magnetometer); (e) ultrasonic and optical flow sensors; (f) an optical range finder (e.g., LIDAR by Leddartch, LIDAR by Velodyne, or LIDAR by Quanergy); (g) RTK-GPS and UWB tags; (h) stereo cameras (optical guidance system); (i) high resolution camera(s); (j) low resolution camera(s); (k) LWIR camera(s); and (l) gimbal position sensors, as well as any others apparent to those skilled in the art. Sensors (a-e), (g), (i), and (j) can also be coupled to a flight controller 126 and a video downlink radio 124.

Based on the collected data generated from operating one or more of such sensors, the flight controller can be configured to operate one or more propellers/motors and gimbal devices for navigation/flight of the counter-attack UAV based on a detected position or flight path of at least one target aerial vehicle.

The counter-attack UAV 102*a* can further comprise a wireless communication device, such as an RF radio 124 (e.g., Mobilicom software defined radio or other similar radio), that can wirelessly receive the command data from the external aerial vehicle detection system 100, and then can transmit the command data to the CPU 122 for processing. The radio 124 can be used to communicate a video feed, captured by the optical sensor(s) 119, back to the external aerial vehicle detection system 100 (or to another external computer system, or even to a manually-monitored display).

Based on the received command data, the counter-attack UAV 102*a* can operate autonomously to fly in a direction toward the detected position of the target aerial vehicle 104*a* to intercept the position or flight path of the target aerial vehicle 104*a*. More specifically, the counter-attack UAV 102*a* can comprise a flight controller 126 coupled to the CPU 122 for receiving command signals associated with the command data processed by the CPU 122. The flight controller 126 can then control the various rotor assemblies (e.g., see rotor assembly 128) that each comprises an electronic speed controller 130 and a motor/propeller 132 that causes the counter-attack UAV 102*a* to operate autonomously in-flight Thus, the CPU 122, the flight controller 126, and the rotor assemblies 128 can define a flight control system 133 that is operable to facilitate flight of the counter-attack UAV 102*a* to intercept the target aerial vehicle 104*a*, as further described herein.

Updated command data can be continuously communicated to the counter-attack UAV 102*a* so that the flight controller 126 can control flight of the counter-attack UAV 102*a*, as corresponding to a tracked flight path or position of the target aerial vehicle 104*a*. In this manner, the counter-attack UAV 102*a* can intercept the target aerial vehicle 104*a*, and can then neutralize the target aerial vehicle 104*a* with an aerial vehicle countermeasure 134*a* (or 134*b*) coupled to or supported by the counter-attack UAV 102*a*, as further exemplified below regarding FIGS. 4-11.

The optical sensors 119 (and/or the other sensors 120) and the CPU 122 can define an on-board aerial vehicle detection system 137 that is operable to detect the target aerial vehicle 104*a* on its own, in one example (e.g., without the assistance of an external aerial vehicle detection system). Thus, the counter-attack UAV 102*a* can detect the target aerial vehicle 104*a* (assuming it is within range), and then the CPU 122 can generate command data, which it can then transmit signals associated with the command data to the flight controller 126 to facilitate flight of the counter-attack UAV to intercept the target aerial vehicle 104*a*. Such on-board aerial vehicle detection system 137 can be operated in conjunction with the external aerial vehicle detection system 100 to track a dynamic flight position of the target aerial vehicle 104*a*, so that if the external aerial vehicle detection system 100 is unable to do such, then the on-board aerial vehicle detection system 137 can continue to such on its own as a back-up detection system.

Concurrently (or alternatively) before the counter-attack UAV 102*a* departs from a grounded position toward the target aerial vehicle 104*a*, command data from the external aerial vehicle detection system 100 can be processed by the CPU 122 of the counter-attack UAV 102*a* to control a pointing position of the optical sensor(s) 119 to "tell" the counter-attack UAV 102*a* where to "look" in airspace to find the target aerial vehicle 104*a*, in one example. Specifically, one of the optical sensors 119 can be rotatably mounted by one or more gimbal device(s) 138 to a flight body or platform of the counter-attack UAV 102*a*. The CPU 122 can then transmit control signals to gimbal controller(s) that control operation of the gimbal device(s) 138 (e.g., 3-axis gimbals) to establish and control a pointing position of the optical sensor (i.e., to point the camera toward the detected target aerial vehicle). As long as the target aerial vehicle 104*a* is within a detection range of the camera (e.g., up to 150 m, or more in some examples), the counter-attack UAV 102*a* can detect and track the position of the target aerial vehicle 104*a* on its own and without the assistance of the external aerial vehicle detection system 100, if necessary.

In some examples, the other sensors 120 can comprise one or more radar device(s), such as compact phased array radars and automotive radars. Small phase array radar systems, such as the Echodyne Mesa-X7, Fortem Technologies TrueView R20, and automotive radar systems like the Delphi Automotive Radar, can be incorporated in the counter-attack UAV 102*a*, which have a range of more than 200 m for small targets, such as small consumer drones (e.g., DJI Phantom 4). A radar array could also be used as a detection sensor of the external aerial vehicle detection system 100 for detection of a target aerial vehicle.

In some examples, in cases where the external aerial vehicle detection system 100 is unable to detect the target aerial vehicle 104*a* (e.g., due to weather, or intermittent signal losses), the counter-attack UAV 102*a* may be able to utilize its components (FIG. 3) to detect, track, and intercept the target aerial vehicle 104*a*. In such instances where the external aerial vehicle detection system 100 is not present or is usable, a number of counter-attack UAVs can be positioned around the airspace area A, such that their respective camera(s) are pointed in directions of interest. And, in response to detection of an incoming target aerial vehicle, the counter-attack UAV(s) can then autonomously detect, classify, track, intercept, and neutralize the target aerial vehicle (that is within the FOV and range of the on-board camera(s), as further discussed herein in various examples).

In some examples where the aerial vehicle countermeasure (e.g., 134*b*) comprises a filament element or net (e.g., FIGS. 5 and 6), the counter-attack UAV 102*a* can support or carry the aerial vehicle countermeasure 134*b* that can comprise a controller 140 operatively coupled to the CPU 122, a release device 142, a countermeasure device or assembly 146, and a countermeasure/UAV interface 148. The countermeasure assembly 146 (e.g., 435 of FIG. 4, and 535 of FIG. 5) can be coupled to a flight body or platform of the counter-attack UAV 102*a* via the countermeasure/UAV interface device 148, such as a quick-release device or other coupling device. Once the target aerial vehicle 104*a* is captured, for instance (FIG. 1), a torque or force sensor 150 (coupled to the countermeasure assembly 146) can sense the fact that the target aerial vehicle has been captured due to the mass of the captured target aerial vehicle 104*a* that pulls on the counter-attack UAV 102*a* due to gravity and air drag. The force sensor 150 may transmit a signal to the CPU 122 accordingly (or to the controller 140), and then the controller 140 can be operated to actuate the release device 142 to release the countermeasure assembly 146 and the captured target aerial vehicle 104*a* at a particular location. This net control and deployment system is further exemplified and described below regarding FIGS. 5 and 6, including a number of components that can be used to achieve the above functionality.

The various components shown in FIG. 3 can be supported by or about a flight body (e.g., flight body 310 shown in FIG. 4) of the counter-attack UAV 102*a* (and other counter-attack UAVs discussed herein). The flight body 310 can comprise a flight body, or a portion thereof, that structurally supports the components discussed regarding FIG. 3 (and that also supports a battery powering some or all of the components).

As illustrated in FIG. 1, and in one example, once the departed counter-attack UAV 102*a* is flown within a certain distance of the target aerial vehicle 104*a* (e.g., 10-150 m), such that the target aerial vehicle 104*a* is within a FOV 136*a* of the optical sensor(s) 119, the counter-attack UAV 102*a* may utilize the optical sensor(s) 119 to continuously track the position of the target aerial vehicle 104*a* for interception and neutralization purposes. For example, a particular on-board optical sensor can comprise a video camera, mounted on a gimbal device (supported and operated by the counter-attack UAV 102*a*), that can be operated to identify and track the target aerial vehicle 104*a*, similarly as discussed above regarding the detection sensors of the external aerial vehicle detection system 100. For instance, a Kalman filter (or another variation of a Bayesian filter) can be executed as an algorithm by a processor of the CPU 122, and that uses digital signals generated by the video camera to estimate and predict the velocity, position, and orientation of the particular target aerial vehicle, and then executes a feedback control loop that autonomously and continuously adjust the gimbal device to keep the target aerial vehicle centered about the FOV 136*a* of the video camera, for instance. Such camera could be equipped with a long or medium focus telephoto lens to maximize the distance at which a target aerial vehicle may be identified and tracked at ranges up to 150 m to 300 m, in some examples, but at the cost of reducing the FOV of the camera. However, because the external aerial vehicle detection system 100 can transmit command data associated with a detected position of the target aerial vehicle 104*a* to the counter-attack UAV 102*a*, a narrower FOV can be acceptable in some instances, if it means the on-board camera has a longer range of detection and tracking capabilities. This principle is similarly true for the target aerial vehicle 104*b* being within a FOV 136*b* of the optical sensor(s) 119, wherein the counter-attack UAV 102*b* (or 102*c*) may utilize the optical sensor(s) 119 to continuously track the position of the target aerial vehicle 104*b* for intercepting a target aerial vehicle.

In some examples, the counter-attack UAV 102*a* (and 102*b*, 102*c*) can be equipped with an optical sensor or camera (e.g., 119) having a narrow band pass filter, and accompanied by an optical frequency matched illumination source (e.g., high-power LED). The LED can be directed to illuminate the target aerial vehicle 104*a*, while reducing background contributions, so that the camera and filter can better detect and track the target aerial vehicle 104*a*. Such on-board camera and narrow band pass filter can also be used to detect only that frequency of light illuminated onto a target aerial vehicle by an illumination device 116*a* of the external aerial vehicle detection system 100, as initially mentioned above regarding the description of FIG. 1.

In some examples, each counter-attack UAV exemplified herein can utilize Visual Inertial Odometry (VIO) technology to assist with flying a path based on landmarks alone without the aid of GPS. VIO technology is the fusion of a monocular camera (or stereo tracked landmarks) and an IMU to lessen inherent drift of the IMU alone. It has been recently shown by Qualcomm Research (and others) that a drone can have less than 1% drift over a flight path of 650 m without the aid of GPS, when utilizing VIO technology. This allows for motion planning and obstacle mapping. Therefore, the counter-attack UAVs discussed herein can implement this VIO technology (along with a high resolution video (e.g., 4K), other low-resolution cameras, dual band Wi-Fi, GNSS, IMU, and a barometer sensor) to "track" a designated target aerial vehicle in which a swarm of counter-attack UAVs can follow its target aerial vehicle at some fixed distance and will navigate obstacles that may block its flight path. In some examples, each counter-attack UAV can utilize GPS-VIO fusion technology to assist with navigation in situations where GPS signals are intermittent (and therefore accurate satellite positioning is unavailable or inaccurate). In this scenario, each counter-attack UAV can comprise a sensor fusion position estimator (e.g., as part of the on-board CPU) to determine and/or update an accurate position. The sensor fusion position estimator can receive data from the on-board GPS device (intermittent signal), on-board camera(s), and an IMU. In this approach, a Kalman filter may be used to combine information from GPS and VIO when GPS is available, thus minimizing trajectory errors computed using VIO along in regions where only VIA is available. For this purpose Kalman filters may be used to estimate the state of the system (e.g. position, and speed) and fuse data obtained using different methods, such as GPS and VIO. Other approaches such as complementary filters, or Bayesian/Markov methods, may also be used to fuse data obtained from different sensing systems and methodologies.

Figure 4:
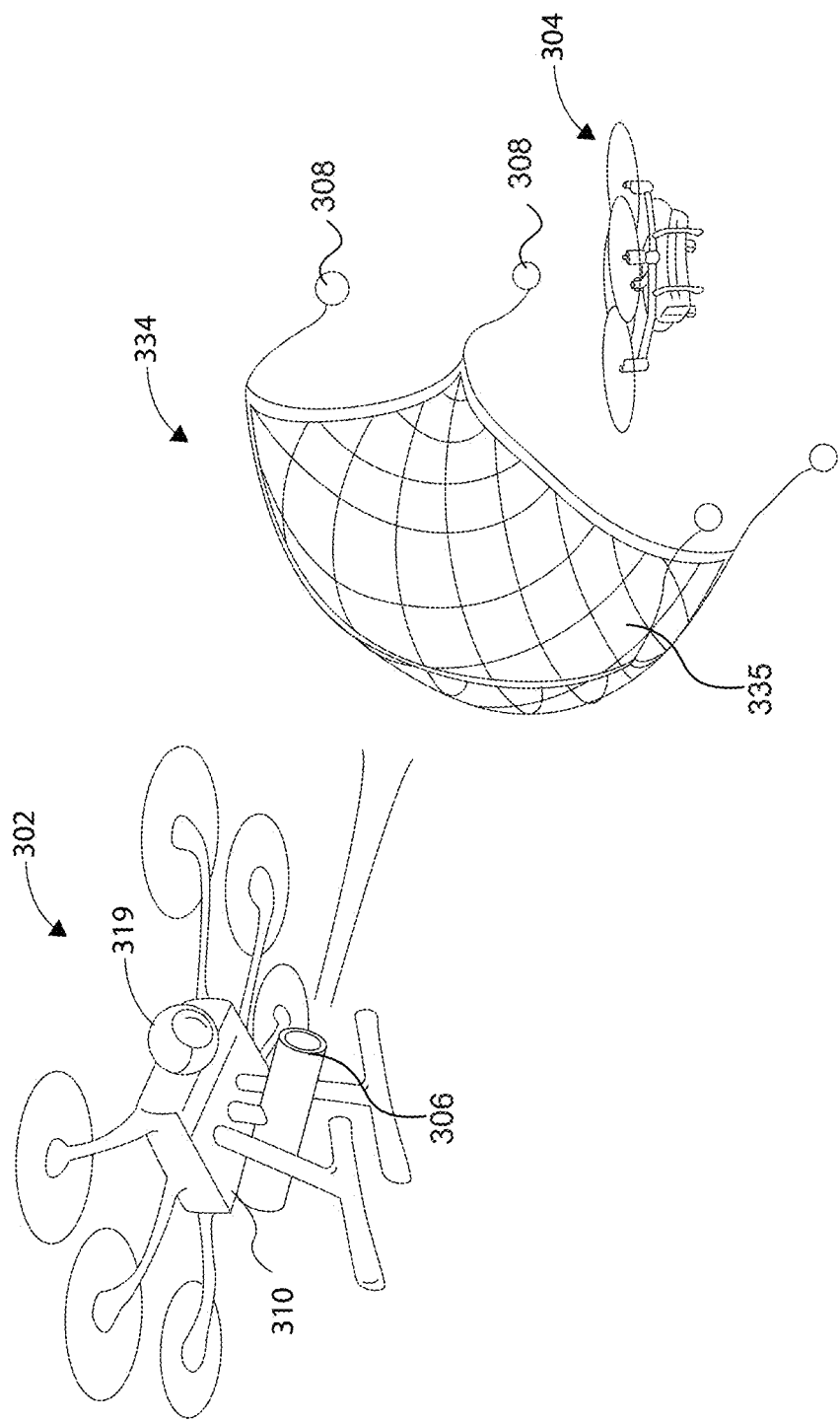
FIG. 4 illustrates another one of the counter-attack UAVs of FIG. 1, launching an aerial vehicle countermeasure, in accordance with an example of the present disclosure.

FIG. 4 illustrates an example system for neutralizing a target aerial vehicle 304 with a counter-attack UAV 302. The counter-attack UAV 302 can have the same or similar features as the counter-attack UAVs described above. The counter-attack UAV 302 can comprise a countermeasure launching device 306 operable to launch an aerial vehicle countermeasure 334 toward the target aerial vehicle 304 to capture or neutralize the target aerial vehicle 304. In one example, the countermeasure launching device 306 can be a single use disruptor tube that is chemically and/or pneumatically powered to shoot or launch the aerial vehicle capture countermeasure 334, such as a net 335 having one or more weights 308 that assist to propel the net 335 during flight. Operation of single use disruptor tubes is well known in the art and, for this reason, will not be discussed in great detail.

The countermeasure launching device 306 can be rotatably mounted to the flight body 310 of the counter-attack UAV 302 via a power driven (e.g., motorized) gimbal device that rotatably controls a pointing position of the countermeasure launching device 306. The gimbal device can be autonomously controlled to be pointed toward the tracked position of the target aerial vehicle 304. Movement of the gimbal device can by synced or coordinated with movement of a gimbal that supports an on-board camera 319, which may be always pointed toward the tracked target aerial vehicle 304, as detailed above regarding FIG. 3. Thus, the countermeasure launching device 306 may also be generally pointed toward the target aerial vehicle 304 as the on-board camera 319 moves while tracking the target aerial vehicle 304. Alternatively, the countermeasure launching device 306 can operate independently of the movement of the on-board camera, such as by the motorized gimbal device that is moved to a position that anticipates the flight path of the target aerial vehicle, such as by utilizing a Kalman filter and on-board CPU that instructs the movement and operation of the countermeasure launching device 306.

Once the counter-attack UAV 302 is in close proximity to the target aerial vehicle 204 (e.g., 1-5 meters) as detected by the on-board camera 319 (or other external sensor), the CPU of the counter-attack UAV 302 can transmit a command signal to a launch controller of the countermeasure launching device 306 that causes launching of the aerial vehicle countermeasure 334.

In another example, a number of pellets or slugs (plastic, metallic, etc.) can be launched or shot from the countermeasure launching device 306. Other aerial vehicle capture countermeasures that can be shot from the countermeasure launching device 306 include, but are not limited to, combustible fluids, adhesives or expanding foams, or even a target tagging agent (e.g., UV florescent paint) for purposes of tracking the target aerial vehicle 304 with a UV sensor. Such impact devices could be housed in a spherical or other shaped breakable projectile housing, much like a paintball housing, that breaks upon impacting an object. In other examples, a plurality of countermeasure launching devices can be supported and operated by a particular counter-attack UAV. In another example, a parachute can be coupled to the aerial vehicle countermeasure 334, so that once the target aerial vehicle is captured, the parachute can effectuate slower/safe entry to the ground to prevent personal injury or damage to structures.

Figure 5:
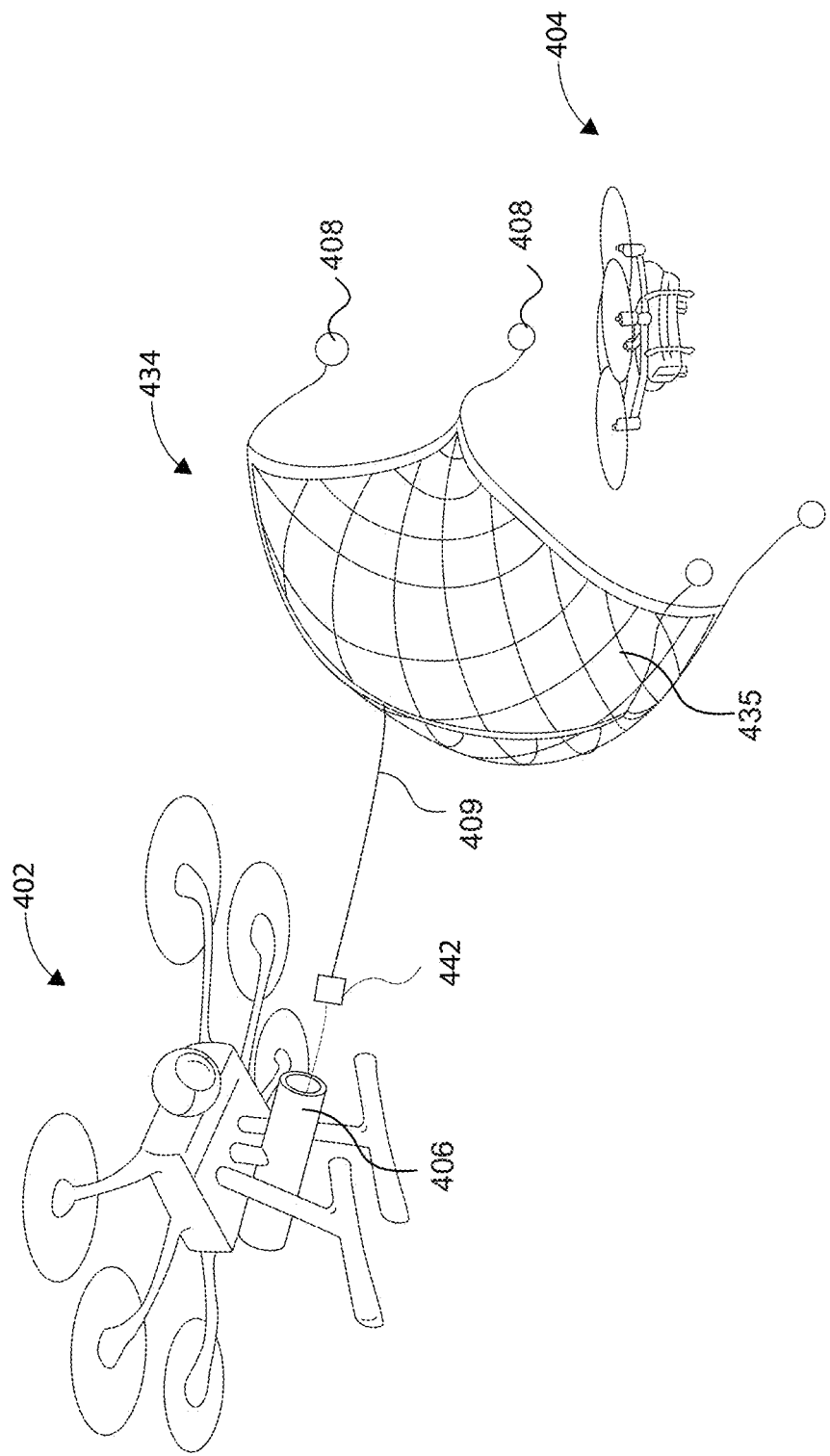
FIG. 5 illustrates another one of the counter-attack UAVs of FIG. 1, launching an aerial vehicle countermeasure, in accordance with an example of the present disclosure.

FIG. 5 shows an alternative system to FIG. 4, where an aerial vehicle countermeasure 434 launched from a countermeasure launching device 406 is tethered to the counter-attack UAV 402 by a flexible line 409. Accordingly, once the target aerial vehicle 404 is captured, the counter-attack UAV 402 can carry and transport the target aerial vehicle 404 to a particular location for safe disposal (i.e., away from people and structures to prevent damage that may result from a target aerial vehicle falling out of the sky at a random or uncontrolled location). The tether 409 can be bundled or spooled inside of the countermeasure launching device 406, and tethered to the countermeasure launching device 406 or the flight body of the counter-attack UAV 402. The tether can be relatively short (e.g., 1 meter) or relatively long (e.g., 10 meters or more).

In one aspect, the counter-attack UAV 402 can have a release device 442 (e.g., 142 of FIG. 3) coupling the flexible line 409 to the counter-attack UAV 402. The release device 442 can be communicatively coupled to the on-board CPU (wired or wirelessly), so that the CPU can operate to instruct actuation of the release device 442 to release the countermeasure launching device 406 and the captured target aerial vehicle 404 to a particular location (and then the counter-attack UAV 402 can fly away). The CPU can effectuate this autonomously by controlling flight of the counter-attack UAV 402 to a safe or predetermined location, and then by controlling the release device to release the net and captured target aerial vehicle. The release device 442 can be any suitable release mechanism operable to release two lines or bodies from each other in response to actuation or operation of the release device. In one example, the release device 442 can comprise a parachute 3-ring release system, or similar approach using a wire activated quick release or pin-in-hole release device.

Figure 6:
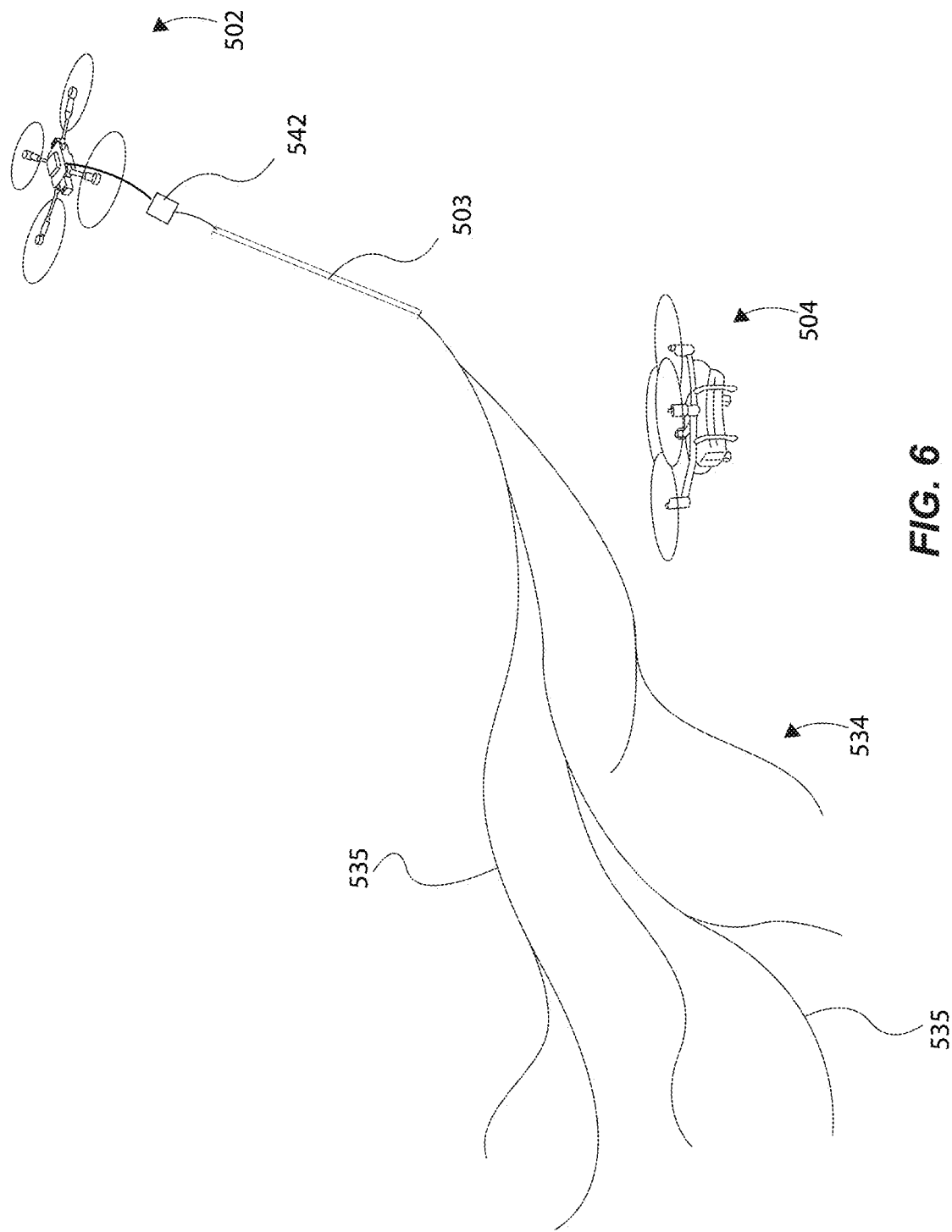
FIG. 6 illustrates one of the counter-attack UAVs of FIG. 1, carrying or supporting an aerial vehicle countermeasure in accordance with an example of the present disclosure.

FIG. 6 shows a system and method of intercepting and neutralizing a target aerial vehicle 504 with a counter-attack UAV 502 in accordance with one example of the present disclosure. The counter-attack UAV 502 can have the same or similar features as the counter-attack UAVs described above with reference to FIGS. 1-5 to intercept and neutralize the target aerial vehicle 504. Here, an aerial vehicle capture countermeasure 534 can be a plurality of tendrils 535 (i.e., not a net) coupled to the counter-attack UAV 502 for entangling rotors of the target aerial vehicle 504 during flight. One or more weights can be coupled to one or more tendrils 535 to help keep the tendrils 535 hanging from the counter-attack UAV 502, and to prevent them from accidentally tangling with the counter-attack UAV 502. Alternatively, as shown, a semi-rigid or rigid rod or other support member 503 can be coupled to the counter-attack UAV 502 and can extend downwardly from the counter-attack UAV 502 to support the tendrils 535 for the same purpose. In this configuration, the tendrils 535 can be deployed (from a stowed to a deployed position) from an elongate cavity through the support member 503 by sufficient wind forces, or by active actuation effectuated by the counter-attack UAV 502 that actuates a release device to release a bundle or collection of tendrils 535 in a suitable manner.

This tendril configuration can provide a low-drag capture mechanism that minimizes drag forces as the counter-attack UAV 502 is operated in airspace, because the drag forces on an individual strand or filament of a particular tendril is quite low because the free end is able to flutter or move in the wind without constraint.

Therefore, upon the counter-attack UAV 502 intercepting the target aerial vehicle 504 (e.g., being in close proximity to each other, as described herein), the aerial vehicle capture countermeasure 534 can be towed and positioned along a predicted or known flight path of the target aerial vehicle 504 to capture the target aerial vehicle 504 in one or more tendrils 535, thereby entangling rotors of the target aerial vehicle 504 to neutralize the target aerial vehicle 504. The tendrils 535 can be relatively long, such as 15 m to 50 m, or more, due to their lightweight properties and low-drag features. In addition, the tendrils 535 can be sufficiently long so as to not pull the counter-attack UAV 502 into contact with any part of the target aerial vehicle 504 prior to the rotation of the rotors of the target aerial vehicle 504 being arrested or stopped.

The tendrils 535 can be configured in a bundled or stowed position in or about the flight body of the counter-attack UAV 502, and then deployable in a deployed position, as shown in FIG. 6. Once captured, the aerial vehicle capture countermeasure 534 and the target aerial vehicle 504 can be transported and released at a particular drop zone, such as away from populated areas. Thus, a release device 542 can be coupled to the counter-attack UAV 502 and the aerial vehicle capture countermeasure 534, and can be operated by the counter-attack UAV 502 to release the aerial vehicle capture countermeasure 534 from the counter-attack UAV 502 (similarly as the release device functionality described above regarding FIG. 5).

Figure 7:
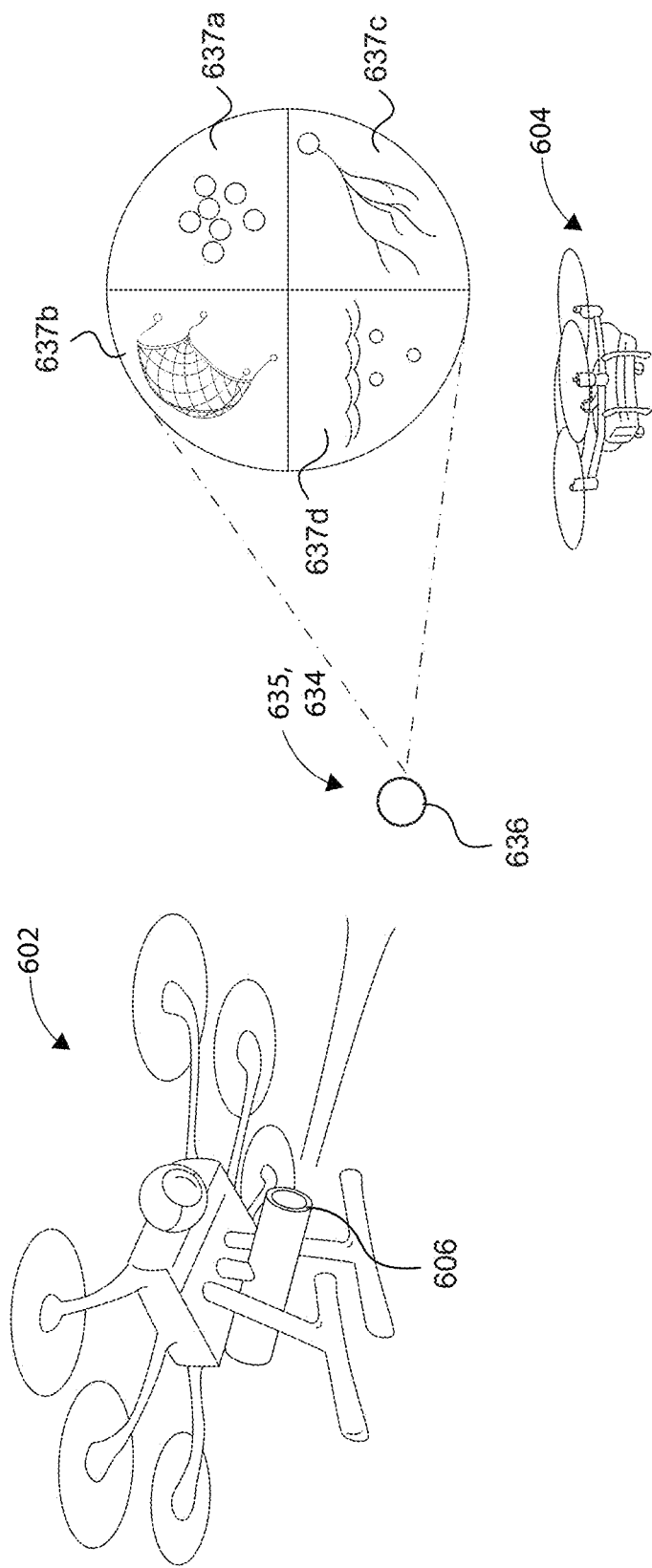
FIG. 7 illustrates another one of the counter-attack UAVs of FIG. 1, launching an aerial vehicle countermeasure, in accordance with an example of the present disclosure.

FIG. 7 illustrates another example of a system for neutralizing the target aerial vehicle 604 with a counter-attack UAV 602. The counter-attack UAV 602 can have the same or similar features as the counter-attack UAVs described above. The counter-attack UAV 602 can comprise a countermeasure launching device 606 operable to launch an aerial vehicle capture countermeasure 634 toward the target aerial vehicle 604 to neutralize the target aerial vehicle 604. The countermeasure launching device 606 can be rotatably mounted to the flight body of the counter-attack UAV 602 via a powered gimbal device, and can be operated in the same manner such as the example countermeasure launching device of FIG. 4.

The countermeasure launching device 606 can be a water cannon or a high pressure pneumatic cannon, or a cannon using chemical propellants (explosives, combustible mixtures such as propane-air and others). Thus, the countermeasure launching device 606 can be operable to launch the aerial vehicle capture countermeasure 634 in the form of a non-Newtonian liquid projectile 635 having a liquid charge. The liquid projectile 635 can comprise a non-rigid encapsulation 636 (e.g., polymer) supporting a non-rigid flight integrity component comprising an additive combined with the liquid charge to inhibit substantial break-up of the liquid charge during flight. Thus, the liquid projectile 635 is configured to fluidly disperse in response to a predetermined event (e.g., impact of with the target aerial vehicle 604). The liquid projectile 635 can include a liquid charge of a specified volume. For example, a liquid projectile may comprise liquid volumes ranging from 1 mL to 5 L. However, this range is not to be considered limiting as liquid projectile can comprise any volume capable of being contained and launched from the counter-attack UAV 602. Water cannons are known in the art and will not be discussed in great detail, but it will be appreciated that various types of water cannons can be utilized, or modified for use.

The non-rigid flight integrity component 638 can modify the liquid charge and inhibit substantial break-up of the liquid charge in-flight. The flight integrity component can be an additive, a non-rigid encapsulation, a temperature modification component, or other component Combining the flight integrity component with a liquid charge can allow the liquid charge to be launched at higher speeds and further distances than a non-modified liquid charge.

Pure water has viscous properties which allow it to reasonably maintain its form when traveling at relatively low speeds or in small quantities, such as a falling raindrop. But, when water is projected at high speeds and in large quantities, such as water projected from a fire hose, the cohesive structure of the water stream can be disrupted by air resistance, causing the resulting water stream to at least partially fracture or break apart into a spray after a certain distance. In order to launch water or other liquid charges at high speeds and far distances a flight integrity component can be combined with the water or other liquid charge to provide enhanced structure, viscosity, and/or cohesiveness. Typical liquids include: water, salt water, liquid fuel, such as flammable fuel, and other liquids.

Liquid modifying additives may also be combined with the liquid charge to inhibit substantial break-up of the liquid during flight. According to one aspect of the invention, a small quantity of polyethylene oxide (PEO), as small as 0.8% (w), can be added to a liquid, such as water, to increase the cohesive properties of the liquid. The resulting liquid projectile will also have less friction and drag than the liquid alone, thus further reducing spray. When the resulting liquid projectile is launched, the friction from a launching device is reduced and the launched stream or missile can have greater cohesiveness, resulting in higher projection speeds, further trajectories, improved accuracy, and more effective impact with a target aerial vehicle.

Similarly, polyacrylamide, polypropylene oxide, polydiamine, and other practical additives known in the art can also be combined with a liquid to inhibit substantial break-up of the liquid during flight. These and other additives can have other properties, aside from inhibiting break-up of a liquid charge during flight, which can be beneficial to liquid projectile applications. These properties may include, being slippery, being adhesive, having an odor, having a discoloration that permanently or temporarily marks a target for instant identification, or having a variety of other useful properties.

Additives can also be combined with a liquid to form shear-thickening fluids, also known as dilatant fluids, in order to inhibit substantial break-up of the liquid during flight. Shear-thickening fluids cause an increase in viscosity of the liquid charge with increasing shear stress which is most easily accomplished by increasing the rate of shear deformation. For example, a shear thickening fluid may offer little resistance to a gentle probe with one's finger, but can become increasingly viscous when one quickly thrusts a finger at the fluid. In this manner, a shear thickened liquid projectile can respond to a launching force with increased resistance, enabling the liquid projectile to be launched with more force. Upon impact this liquid projectile can increase its resistance to the stress of the impact, thus acting more like a solid projectile and inflicting greater damage to the target.

Typical shear thickening additives can include: polyethylene glycol with nano-particles of silica, corn starch or modified corn starch, potato starch, pectin, xanthan gum, arrow root powder, dihydroxypropyl ethers of cellulose, cellulose-free xanthan gum with a number of cellulose compounds, including carboxymethyl cellulose, hydroxyethyl cellulose and hydroxypropylmethyl cellulose. Other examples include, sulfonated guar and a compound comprising at least one member selected from the group consisting of xanthan gum, guar, hydroxypropyl guar or derivatives, hydroxyethyl cellulose or derivatives. Further shear thickening additives may include, cationic guar and a compound comprising at least one member selected from the group of hydroxypropyl guar or derivatives and hydroxyethyl cellulose or derivatives, hydroxypropyl cellulose with polymaleic and hydroxy derivatives, or any combination as will be practical to the invention.

Additives may be combined with a liquid charge by mixing, stirring, heating/cooling processes, injecting, reacting or applying, as well as combinations of these processes. Other combining methods are similarly contemplated in accordance with the invention.

The non-rigid encapsulation 636 can comprise a disruption apparatus or controlled disruption mechanism (shown generally as disruption apparatus) that is configured or adapted to disrupt the flight integrity component in the form of a non-rigid encapsulation and to facilitate the dispersion of or diffuse the liquid charge. The disruption apparatus can function to breach or break up or break open the flight integrity component or encapsulation of the liquid projectile, or otherwise facilitate the dispersion of the liquid charge. The disruption apparatus may be used to control the timing of the dispersion of the liquid charge (e.g., delayed or upon impact or during flight), the direction of the dispersion of the liquid charge (e.g., forward dispersion), etc. Essentially, the disruption apparatus helps to prevent the unwanted situation where the liquid projectile remains intact (the liquid charge is not dispersed) after being launched, and therefore ineffective for its intended purpose.

The disruption apparatus may comprise any system or device capable of breaching or otherwise breaking open the flight integrity component of the liquid projectile after being launched (i.e., the disruption apparatus can rip, tear, disassemble, explode or otherwise breach the encapsulation). The disruption apparatus may be configured to operate with the encapsulation or the closing device, or both. The disruption apparatus may be configured to be activated during flight of the liquid projectile (e.g., an airborne dispersant), or it may be activated upon or at some point after impact. The disruption apparatus may comprise mechanical, electrical, electromechanical systems. For example, the disruption apparatus can comprise an explosive device or charge supported somewhere on the liquid projectile. In another example, the disruption apparatus may comprise a mechanical device that impales or otherwise breaches a portion of the liquid projectile. One skilled in the art will recognize other objects or devices or systems capable of performing the function of breaching the liquid projectile.

The disruption apparatus may be triggered or activated in a number of ways, and from a variety of sources, such as radio frequencies, heat sensors, timing mechanisms, laser devices, and other suitable means. For example, the disruption apparatus may be operable with a trigger of some sort. The trigger may comprise a real-time operator-initiated trigger, wherein the operator selectively triggers or activates a delayed disruption of the non-rigid encapsulation and the diffusing of the liquid charge at a time judged to be most appropriate or effective. Alternatively, the trigger may comprise a programmed trigger, such as a preprogrammed trigger that reflects actual conditions or variables to be encountered. In still another embodiment, the liquid projectile may support a spool of wire (e.g., for receiving electrical signals that activate an associated disruption apparatus) or string (for activating a mechanical disruption apparatus) that is spooled in response to launch of the liquid projectile.

Rheologically modified fluids can also be combined with the non-rigid flight integrity component (e.g., additive, non-rigid encapsulation component) to allow for solid substances to be entrained in the liquid charge. For example, 0.10% (w) Carbopoli® 674 (a product of Noveon) can be combined with a liquid charge to entrain or suspend sand particles within the liquid charge. In this manner, a variety of solids can be entrained in a liquid charge and launched. These solids can be capsules of paint, sand, pellets, explosive charges, and other solids that will be practical to the invention. In one aspect, the rheologically modified fluids can function as a flight integrity component to increase the cohesive properties of the liquid projectile in-flight. In another aspect, the rheologically modified fluids can provide additional mass to increase the impact force applied to the target, as well as a delivery system that transports the solids to the target.

A sighting structure can be coupled to the countermeasure launching device 606 for identifying and targeting the target aerial vehicle 604, for instance. The sighting structure can include a laser sight, an infra-red targeting system, optic sights, dot sights, ring sights, peep sights, a scope, and the like. Alternatively, a sighting structure can include a camera (e.g., 4K mounted on a gimbal, as discussed above).

Therefore, the aforementioned "predetermined event" can comprises the liquid projectile 635 actually impacting the target aerial vehicle 604, such that the dispersed liquid charge interrupts operation of at least one electronic device (e.g., motors, sensors, CPU, controller, etc.) of the target aerial vehicle 604, or that damages the target aerial vehicle so that it can no longer fly. In other examples, the controlled disruption mechanism can be configured to fluidly disperse the liquid projectile 635 in response to another predetermined event. For instance, the predetermined event can comprise at least one of a predetermined distance from the counter-attack UAV 602, a predetermined time from launch from the counter-attack UAV 602, and/or a detected distance from the target aerial vehicle 604. In this manner, the CPU of the counter-attack UAV 602 can be programmed to determine the distance and/or time associated with the launch of the liquid projectile 635, and then cause breaking of the encapsulation 636 via a trigger (e.g., radio frequencies, heat sensors, timing mechanisms, laser devices, etc.), as discussed above. Therefore, when the liquid projectile 635 is in-flight proximate the target aerial vehicle 604, the controlled disruption mechanism can be activated to break open the liquid projectile 635, thereby exposing contents therein (which would still be traveling at some velocity relative to the velocity of the liquid projectile 635 before breaking open).

In some examples, the liquid projectile 635 can comprise at least one direct-impact device configured to impact and neutralize the target aerial vehicle 604, such as pellets 637*a* (e.g., plastic, polymer and/or metallic, composite), a filament element 637*b* (monofilament gill net), filaments 637*c* (monofilaments), and/or a liquid 637*d* (e.g., water, a water and chemical solution, or even foam, adhesive, etc.). In one example, the liquid projectile 635 can comprise a tagging agent to tag the target aerial vehicle 604 for tracking flight path with a sensor (e.g., 106*a* or 206*a*), or other tracking system.

In a specific example, the counter-attack UAV 602 can be operated autonomously to intercept the target aerial vehicle 604 (as detailed above). Once the counter-attack UAV 602 is within striking distance (e.g., within 2-5 meters) of the target aerial vehicle 604, the counter-attack UAV 602 can autonomously launch the liquid projectile 635 toward the target aerial vehicle 604 at a known trajectory and velocity (e.g., 25 m/s), and then when the liquid projectile 635 is at a predetermined distance from the target aerial vehicle 604 (e.g., approximately 1 meter away from impacting the target aerial vehicle 604), the controlled disruption mechanism can be activated to break open the liquid projectile 635. The contents (e.g., the net 637*b*, having one or more weights, for instance), can then break free from the liquid projectile 635 and generally continue the trajectory and velocity of the liquid projectile 635 (before break up), to impact and in some cases entangle with rotors of the target aerial vehicle 604, thereby disrupting its operation to capture and neutralize it.

Figure 8:
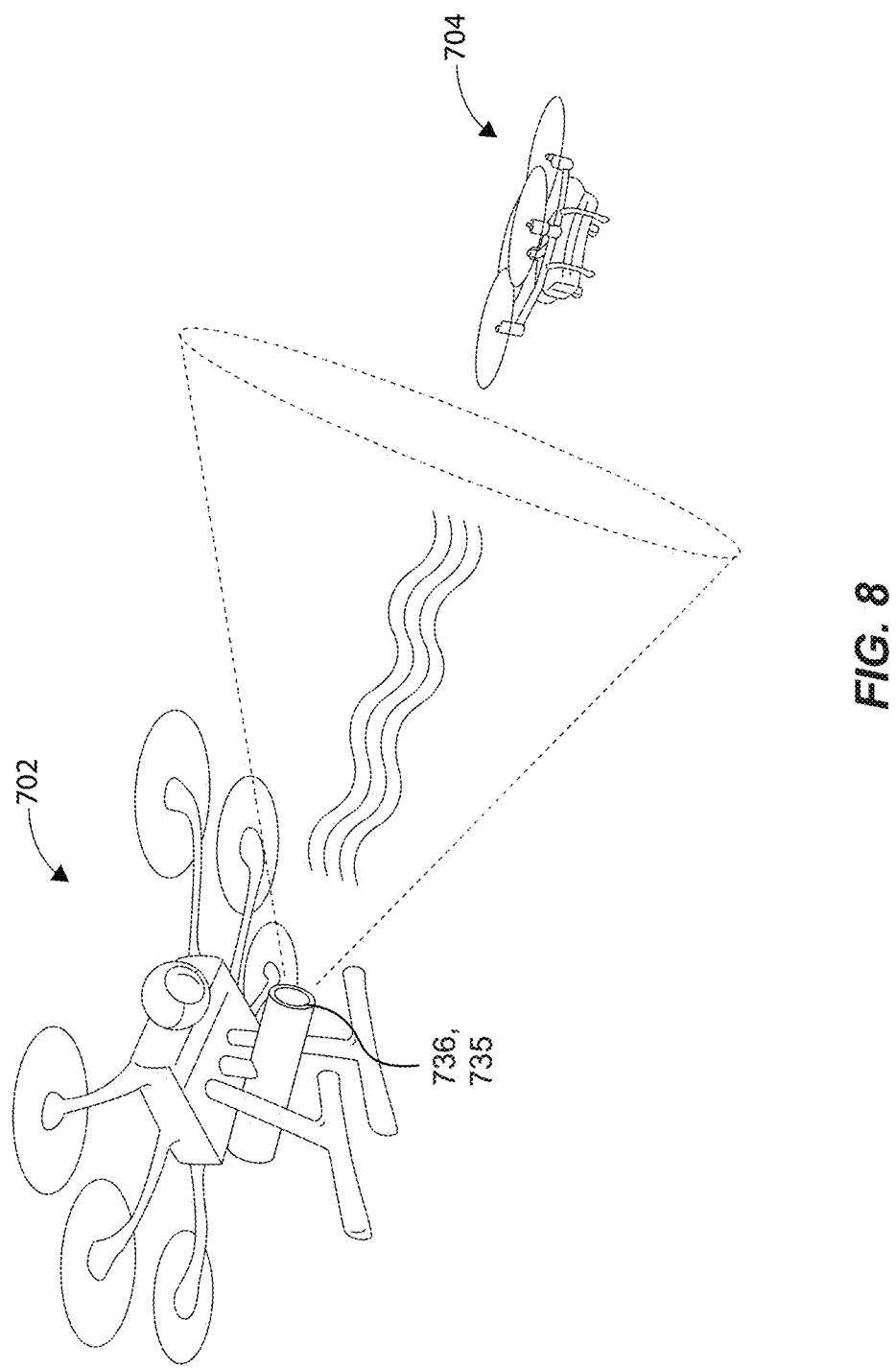
FIG. 8 illustrates another one of the counter-attack UAVs of FIG. 1, operating an aerial vehicle countermeasure, in accordance with an example of the present disclosure.

FIG. 8 illustrates another example system for neutralizing a target aerial vehicle 704 with a counter-attack UAV 702. The counter-attack UAV 702 can have the same or similar features as the counter-attack UAVs described above. The counter-attack UAV 702 can comprise an aerial vehicle capture countermeasure 735 in the form of direct energy device 736 operable to disrupt operation of at least one component or system of the target aerial vehicle 704. In one example, the direct energy device 736 can comprise a light emitter operable to emit light at a predetermined frequency that disrupts operation of at least one sensor of the target aerial vehicle 704, thereby neutralizing the target aerial vehicle 704. More specifically, the direct energy device 736 can be an ultra-bright light emitter, which emits light at frequencies that cameras are sensitive to (such as a 4K camera on the target aerial vehicle 704), including across the full or partial spectrum of the capability of such camera. The direct energy device 736 could be coupled to a controller and CPU of the counter-attack UAV 702, and the CPU can be programmed to cause flashes at intervals and for durations that most effectively put such cameras into a perpetual state of dynamic light exposure adjustment. This makes them ineffective for either vision, or being used to provide visual inertial odometry, collision avoidance, or object recognition. This is another example of "neutralizing" a target aerial vehicle by disrupting operations or functionality of one or more components or systems of the target aerial vehicle. As described above regarding FIG. 4, the aerial vehicle capture countermeasure 735 can be rotatably coupled to the counter-attack UAV 702 via a gimbal device, which may or may not move in-sync with a gimbal device supporting an on-board camera.

In another example, the direct energy device 736 can comprise at least one of an air vortex cannon, an acoustic wave device, a microwave device, or a laser. As an air vortex cannon, small doughnut-shaped air vortices can be projected towards the target aerial vehicle for disrupting its flight, which may cause its rotors to automatically stop working, such that the target aerial vehicle falls to the ground. As an acoustic wave device, it can be used to excite resonance in a gyroscope of the target aerial vehicle, which can make it lose control and fall to the ground. As a microwave device, high-powered microwave weapons can be mounted to the counter-attack UAV and directed toward the target aerial vehicle to interrupt the electronics and/or guidance system on the target aerial vehicle, which can cause it to fall to the ground. Using a laser, a high-powered laser could be mounted to the counter-attack UAV and directed to the target aerial vehicle to damage or disrupt operation of the target aerial vehicle, which can cause it to fall to the ground Concurrently, or alternatively, such direct energy devices can be part of the external aerial vehicle detection system (i.e., on a ground-based structure, a vessel, etc.), and can be used in conjunction with the various vehicle detection sensors and systems described herein for detecting, tracking, and neutralizing target aerial vehicles.

Figure 9:
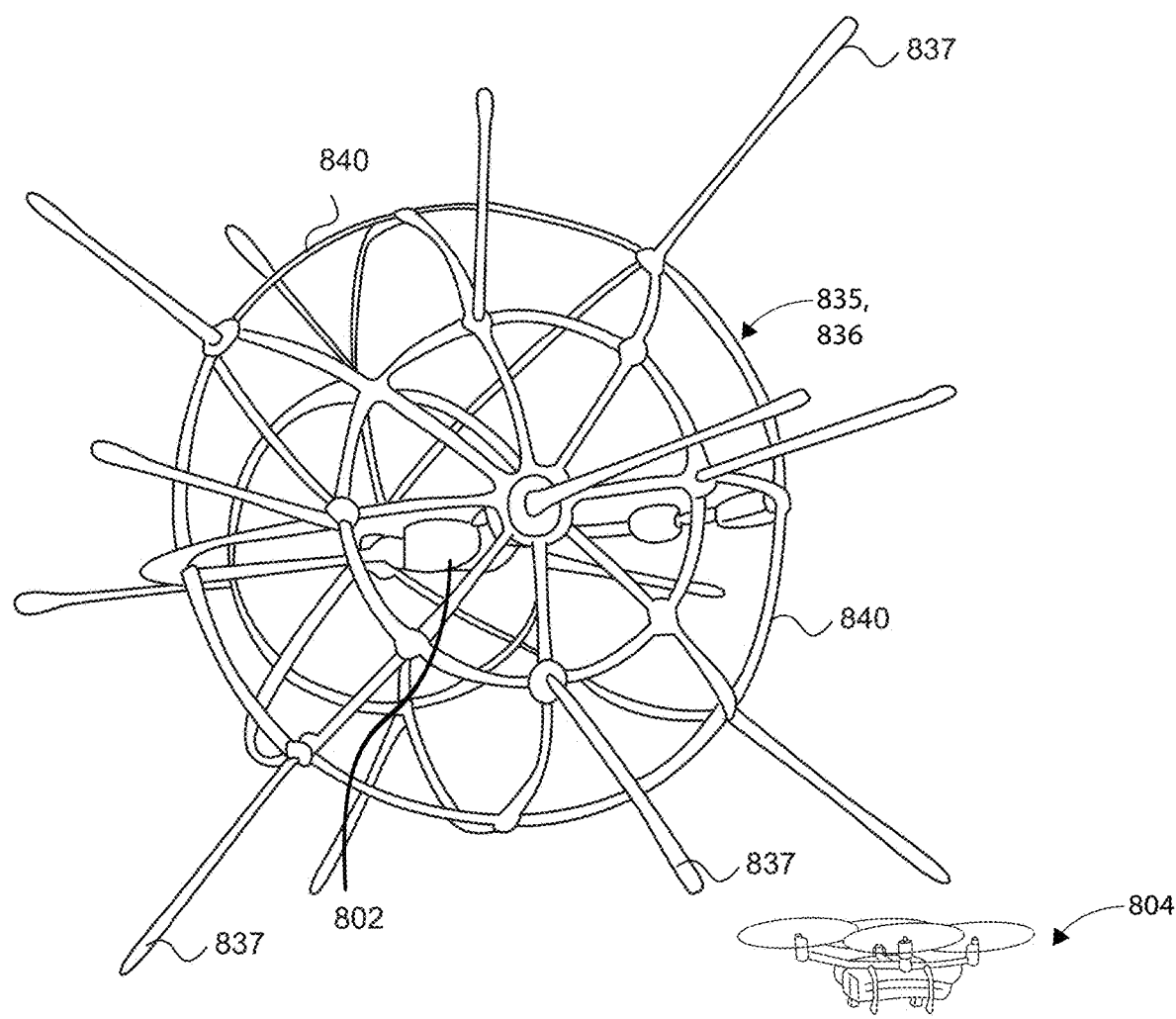
FIG. 9 illustrates another one of the counter-attack UAVs of FIG. 1, supporting an aerial vehicle countermeasure, in accordance with an example of the present disclosure.

FIG. 9 illustrates another example of a system for neutralizing a target aerial vehicle 804 with a counter-attack UAV 802. The counter-attack UAV 802 can have the same or similar features as the counter-attack UAVs described above. The counter-attack UAV 802 can comprise an aerial vehicle capture countermeasure 835 in the form of a cage device 836 operable to disrupt operation by impacting the target aerial vehicle 804, thereby neutralizing the target aerial vehicle 804. More specifically, the cage device 836 can be formed of a plurality of radial support members 840 that are interconnected to each other to surround the counter-attack UAV 802 (e.g., carbon fiber rods, fiberglass, printed plastic/polymer, etc.). The cage device 836 can be coupled to the flight body of the counter-attack UAV 802, such as via one or more support rods attached to the flight body and that extend outwardly to the radial support members that define the cage device 836. The cage device 836 can be defined by two half-shells or hemispheres that are coupled to each other so that the counter-attack UAV can be positioned and supported inside of the cage device 836. Other suitable means and mechanism for attaching the counter-attack UAV are contemplated herein. Therefore, the rotors of the counter-attack UAV 802 can be operable to fly the counter-attack UAV 802 and the cage device 836 to intercept and neutralize the target aerial vehicle 804.

More specifically, the cage device 836 can comprise one or more of the support members 837 that extend outwardly from the radial support members 840. Because any impact with a rotor of the target aerial vehicle 804 causes automatic shut-down of the target aerial vehicle 804, the counter-attack UAV 802 can be autonomously operable to fly directly towards or into a detected flight path of the target aerial vehicle 804, so that one or more of the support members 837 impact the target aerial vehicle 804, which functions to disrupt operation of the target aerial vehicle 804 to neutralize its flight or operation.

In one aspect, the support members 837 can be comprised of a plurality of filament elements (e.g., strands, monofilaments) bound together by a breakable material formed into a solid state, such as a sugar compound or other mixture that binds together the filaments in a desired shape to maintain the shape of the support member. Ends of the filament elements can be coupled or attached to the radial support members 840 in a suitable manner. Therefore, upon the target aerial vehicle 804 impacting one or more of the support members 837, the support member 837 breaks up or apart from its solid state or form (because of its fragility being bound by sugar). This releases the plurality of filament elements from being bound together, which allows them move freely in the air and readily become entangled in a rotor of the target aerial vehicle 804. Thus, the target aerial vehicle 804 can be captured by the cage device 836, and then the counter-attack UAV 802 can be operated to fly to a safe or predetermined location for landing with the captured target aerial vehicle 804. In this manner, a torque or force sensor can be coupled to the CPU of the counter-attack UAV 802 and to the cage mechanism 836 to sense the existence of a captured target aerial vehicle 804, so that the counter-attack UAV 804 can autonomously fly to a safe location to deliver the captured target aerial vehicle 804.

Figure 10:
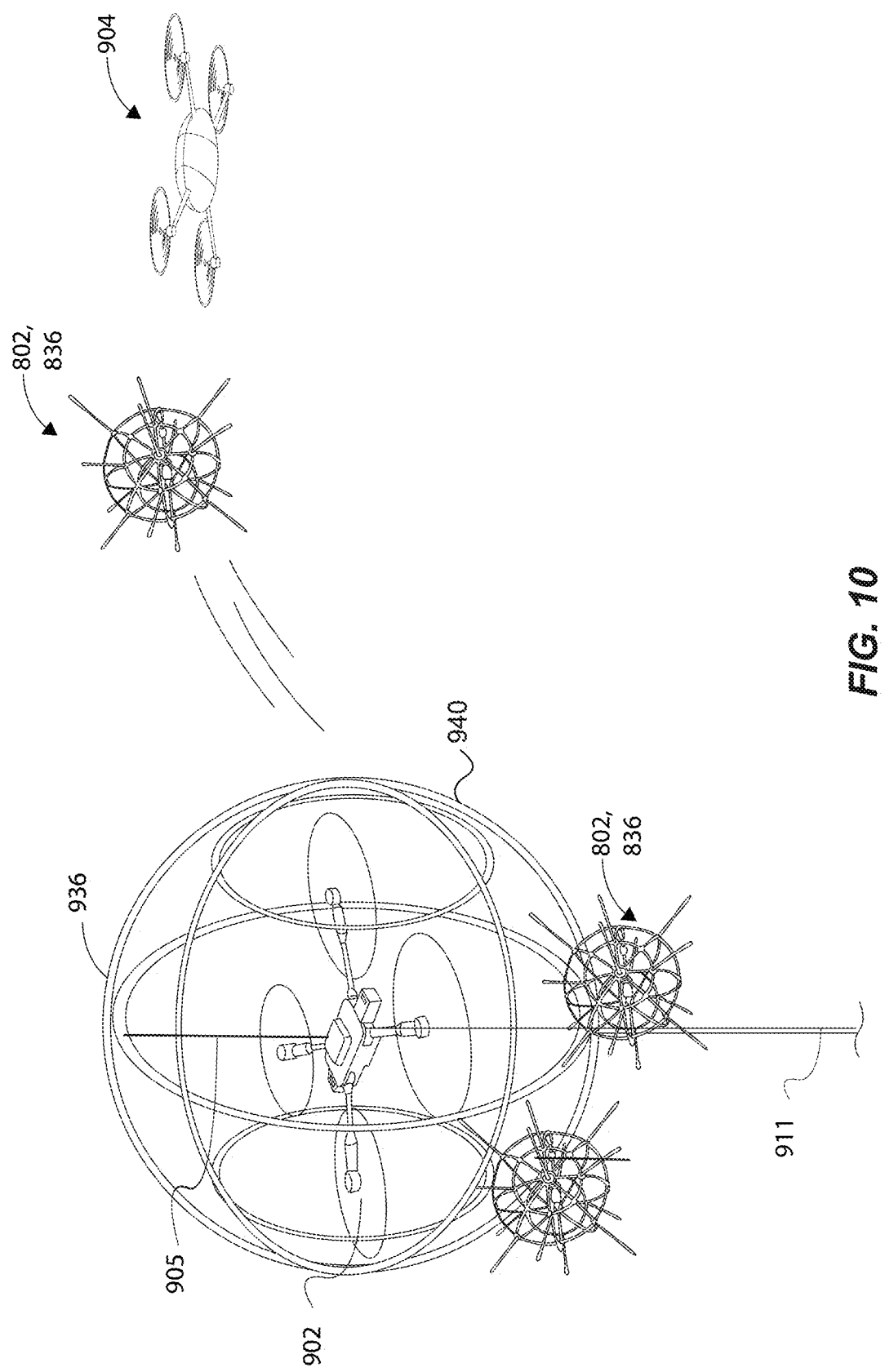
FIG. 10 illustrates another one of the counter-attack UAVs of FIG. 1, supporting an aerial vehicle countermeasure in the form of a cage device that supports one or more other counter-attack UAVs, in accordance with an example of the present disclosure.

FIG. 10 illustrates an example system for neutralizing a target aerial vehicle 904 with operation of a transport counter-attack UAV 902 that supports counter-attack UAVs 802 (such as counter-attack UAV 802 described regarding FIG. 9). The transport counter-attack UAV 902 can have the same or similar features as the counter-attack UAVs described above. The counter-attack UAV 902 can comprise a cage device 936 coupled to the transport counter-attack UAV 902 by at least one support member 905 coupled to the flight body of the counter-attack UAV 902. The cage device 936 can be formed of a plurality of radial support members 940 that are interconnected to each other to surround the transport counter-attack UAV 902 (e.g., carbon fiber rods, fiberglass, printed plastic/polymer, etc.). Each of the counter-attack UAVs 802 can be removably coupled to the cage device 936 by a suitable means, such as by coupling the cage device 836 to the cage device 936 by a breakable component or filament. Thus, in response to detection of the target aerial vehicle 904, the counter-attack UAV 802 can be activated to operate in-flight to deploy or fly away from the cage device 936, thereby breaking the breakable element or filament so that the counter-attack UAV 802 can intercept and neutralize the target aerial vehicle 904. Alternatively, the counter-attack UAV 802 can be coupled to the cage device 936 by a release device that is actuatable by a CPU to release the counter-attack UAV 802 from the cage device 936.

In one example, the transport counter-attack UAV 902 can be tethered to a structure or other device by a tether 911 coupled to the cage device 936. The tether 911 can comprise an electrical power line that is electrically coupled to a battery on-board the transport counter-attack UAV 902 for extended or indefinite flight time. The transport counter-attack UAV 902 can be operated to fly around with limited travel by virtue of being tethered to a structure. In response to detecting a target aerial vehicle, the transport counter-attack UAV 902 can be operated to fly from a grounded or stowed position to a flight position, as shown in FIG. 10. Then, the attached counter-attack UAVs 802 can be commanded or instructed to depart and intercept the target aerial vehicle 904, as detailed herein.

Alternatively, the transport counter-attack UAV 902 may not be tethered to anything, and may be operable to fly autonomously and deliver the counter-attack UAVs 802 to a location for deployment, which can prolong the overall range and flight time of the counter-attack UAVs 802 intended to neutralize the target aerial vehicle(s). The counter-attack UAVs 802 may be smaller, high performance UAVs that are quicker and more agile than the transport counter-attack UAV 902, because its primary purpose is delivery of counter-attack UAVs 802.

Figure 11:
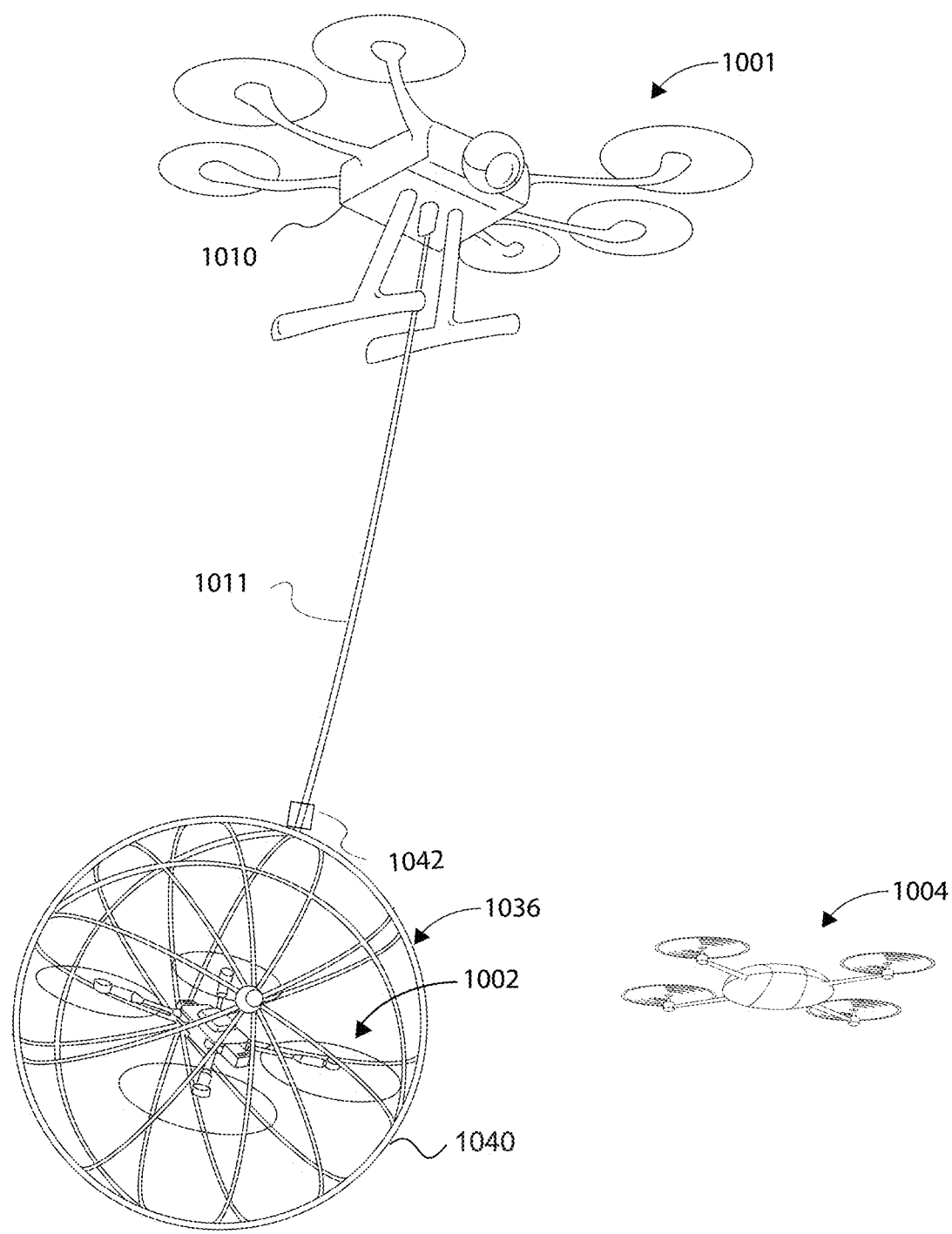
FIG. 11 illustrates another one of the counter-attack UAVs of FIG. 1, supporting or carrying another one of the counter-attack UAVs of FIG. 1 that supports an aerial vehicle countermeasure in the form of a cage device, in accordance with an example of the present disclosure.

FIG. 11 illustrates another example system for neutralizing a target aerial vehicle 1004 with a transport counter-attack UAV 1001 that supports one or more counter-attack UAVs 1002 (such as counter-attack UAV 902 described regarding FIG. 10). The transport counter-attack UAV 1001, and the counter-attack UAV 1002, can have the same or similar features as the counter-attack UAVs described above. The counter-attack UAV 1002 can comprise a cage device 1036 coupled to the transport counter-attack UAV 1002 by at least one support member (see e.g., FIG. 10) coupled to the flight body of the counter-attack UAV 1002. The cage device 1036 can be formed of a plurality of radial support members 1040 that are interconnected to each other to surround the transport counter-attack UAV 1002 (e.g., carbon fiber rods, fiberglass, printed plastic/polymer, etc.). The cage device 1036 (and the counter-attack UAV 1002) can be coupled to the transport counter-attack UAV 1001 by a tether 1011, which can be 1 to 50 meters, or more. A release device 1042 can be coupled between the tether 1011 and the cage device 1036, and which is in communication with and actuatable by a CPU (of UAV 1002 or 1001) to release the cage device 1036 from the tether 1011 at a predetermined time and location.

Therefore, in response to detecting the target aerial vehicle 1004, the transport counter-attack UAV 1001 can be operated to fly from a grounded or stowed position to operate in-flight towards the detected target aerial vehicle 1004. Then, when in close proximity to the target aerial vehicle 1004, the attached counter-attack UAV 1002 can be separated from the tether 1011 by the release device, and then be operated in-flight, and then be autonomously flown to intercept the target aerial vehicle 1004, as detailed elsewhere herein. The counter-attack UAV 1002 can then impact the target aerial vehicle 1004 with the cage device 1036 (or with support member, like support members 837 described regarding FIG. 9). Alternatively, the cage device 1036 may not be used, and instead the transport counter-attack UAV can transport a tethered counter-attack UAV with another type of aerial vehicle countermeasure device, such as the example counter-attack UAVs described above regarding FIGS. 4-8.

The system described regarding FIG. 11 provides the advantage of delivering a high-performance counter-attack UAV (e.g., 1002) to a particular altitude and area of interest proximate a detected target aerial vehicle by operating a transport counter-attack UAV (e.g., 1001), which may have a higher payload capacity than the high-performance counter-attack UAV used to neutralize the target aerial vehicle. This can provide a mechanism to deliver a high-performance counter-attack UAV to a distant location without having to utilize any battery power on-board the counter-attack UAV until the counter-attack UAV is in position and released from the transport counter-attack UAV.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for detecting and neutralizing a target aerial vehicle, the system comprising:
   at least one counter-attack unmanned aerial vehicle (UAV) comprising:
      a flight body; and
      a flight control system that controls flight of the at least one counter-attack UAV;

an aerial vehicle countermeasure supported by one or more of the at least one counter-attack UAV; and an aerial vehicle detection system comprising a plurality of detection sensors operable to detect the target aerial vehicle and to generate position data associated with the target aerial vehicle, the aerial vehicle detection system being operable to eliminate the generated position data associated with one or more detection sensors of the plurality of detection sensors based on a credibility hierarchy associated with the plurality of detection sensors and operable to provide command data to the at least one counter-attack UAV to facilitate interception of the target aerial vehicle by the at least one counter-attack UAV;

wherein, in response to interception of the target aerial vehicle, the at least one counter-attack UAV disrupts operation of the detected target aerial vehicle with the aerial vehicle countermeasure.

2. The system of claim 1, wherein the command data comprises at least one of intercept data, aerial vehicle countermeasure deployment command data, target aerial vehicle detection data, counter-attack UAV control data, or a combination thereof.

3. The system of claim 1, wherein the aerial vehicle detection system comprises an on-board aerial vehicle detection system, the flight control system comprising a flight controller operable to control autonomous flight of the at least one counter-attack UAV based on the generated position data associated with the target aerial vehicle.

4. The system of claim 1, wherein the aerial vehicle detection system comprises an external aerial vehicle detection system, the external aerial vehicle detection system operable to provide the command data to the at least one counter-attack UAV to facilitate interception of the target aerial vehicle.

5. The system of claim 4, wherein the external aerial vehicle detection system is associated with a ground-based structure to monitor an airspace, wherein the plurality of detection sensors are configured to detect a plurality of target aerial vehicles.

6. The system of claim 4, wherein the at least one detection sensor comprises an acoustic sensor, an infrared camera, an optical camera, an ultrasonic sensor device, a range finder sensor, or combinations thereof.

7. The system of claim 4, further comprising at least one camera movably coupled to the flight body, the at least one camera movable to establish and modify a pointing position, based on the command data received from the external aerial vehicle detection system, to detect and track the target aerial vehicle.

8. The system of claim 1, wherein the aerial vehicle countermeasure comprises at least one flexible entangling element configured to disrupt operation of at least one rotary propeller device of the target aerial vehicle.

9. The system of claim 1, wherein the at least one counter-attack UAV further comprises a countermeasure launching device operable to launch the aerial vehicle countermeasure toward the target aerial vehicle to impact and neutralize the target aerial vehicle.

10. The system of claim 9, wherein the aerial vehicle countermeasure comprises a net launchable by the countermeasure launching device to capture and neutralize the target aerial vehicle.

11. The system of claim 10, the net is tethered to the at least one counter-attack UAV, such that the target aerial vehicle is tethered to the at least one counter-attack UAV upon being captured in the net.

12. The system of claim 9, wherein the aerial vehicle countermeasure comprises a projectile comprising a liquid projectile comprising a liquid charge and a non-rigid flight integrity component comprising an additive combined with the liquid charge to inhibit substantial break-up of the liquid charge during flight, the liquid projectile configured to fluidly disperse in response to a predetermined event.

13. The system of claim 12, wherein the predetermined event comprises the liquid projectile impacting the target aerial vehicle, wherein the dispersed liquid charge is configured to interrupt operation of at least one electronic device of the target aerial vehicle.

14. The system of claim 12, wherein the liquid projectile further comprises at least one direct-impact device configured to impact and neutralize the target aerial vehicle, wherein the at least one direct-impact device comprises plastic or polymer pellets, metallic pellets, composite pellets, a filament element, or a tagging agent.

15. The system of claim 1, wherein the aerial vehicle countermeasure comprises an illumination device operable to emit light at a predetermined frequency that disrupts operation of at least one sensor of the target aerial vehicle to disrupt operation of the target aerial vehicle.

16. The system of claim 1, wherein the aerial vehicle countermeasure comprises at least one support member extending outwardly from the at least one counter-attack UAV and configured to impact the target aerial vehicle and neutralize the target aerial vehicle.

17. The system of claim 16, wherein the at least one support member comprises a plurality of support members supported by the flight body of the at least one counter-attack UAV.

18. The system of claim 1, wherein the aerial vehicle countermeasure comprises a cage device surrounding the at least one counter-attack UAV, the cage device comprising at least one support member extending from the cage device and configured to impact the target aerial vehicle and neutralize the target aerial vehicle.

19. The system of claim 18, wherein the at least one support member comprises a plurality of filament elements bound together by a breakable material in a solid state, whereby upon impact the breakable material breaks, thereby releasing the plurality of filament elements from each other to become entangled in a rotor of the target aerial vehicle.

20. The system of claim 1, further comprising a transport counter-attack UAV, wherein the at least one counter-attack UAV is releasably coupled to the transport counter-attack UAV, wherein, in response to detecting the target aerial vehicle, the at least one counter-attack UAV is released from the transport counter-attack UAV to operate in-flight to neutralize the target aerial vehicle.

21. The system of claim 20, wherein the at least one counter-attack UAV comprises a plurality of counter-attack UAVs releasably coupled to the transport counter-attack UAV, wherein, in response to detecting of the target aerial vehicle, at least one of the plurality of counter-attack UAVs is released from the transport counter-attack UAV to operate in-flight to neutralize the target aerial vehicle.

22. The system of claim 4, wherein at least one of the aerial vehicle countermeasure or the external aerial vehicle detection system comprises a direct energy device operable to direct energy towards the target aerial vehicle for disrupting operation of one or more systems of the target aerial vehicle.

23. The system of claim 22, wherein the direct energy device comprises at least one of an air vortex cannon, an acoustic wave device, a microwave device, or a laser.

24. A method for neutralizing a target aerial vehicle, comprising:
  detecting the target aerial vehicle with a plurality of detection sensors of an aerial vehicle detection system, the plurality of detection sensors generating position data associated with the target aerial vehicle, and the aerial vehicle detection system eliminating the generated position data associated with one or more detection sensors of the plurality of detection sensors based on a credibility hierarchy associated with the plurality of detection sensors;
  transmitting command data, associated with the detected target aerial vehicle, to at least one counter-attack UAV;
  operating the at least one counter-attack UAV to intercept the target aerial vehicle; and
  operating an aerial vehicle countermeasure supported by the at least one counter-attack UAV to interrupt operation of the target aerial vehicle when the at least one counter-attack UAV is in close proximity to the target aerial vehicle.

25. The method of claim 24, wherein detecting the target aerial vehicle comprises autonomously detecting the target aerial vehicle and autonomously tracking the target aerial vehicle.

26. The method of claim 24, further comprising establishing a pointing position of a camera of the at least one counter-attack UAV to track the target aerial vehicle, the pointing position based on the command data received from the aerial vehicle detection system.

27. The method of claim 24, wherein the aerial vehicle countermeasure comprises a filament element, the method further comprising operating the at least one counter-attack UAV to capture the target aerial vehicle in the filament element, thereby neutralizing the target aerial vehicle.

28. The method of claim 24, wherein the aerial vehicle countermeasure comprises a projectile, the method comprising launching the projectile from a countermeasure launching device of the at least one counter-attack UAV to impact and neutralize the target aerial vehicle.

29. The method of claim 28, wherein the projectile comprises a filament element, wherein interrupting operation of the target aerial vehicle further comprises entangling at least one rotary propeller device of the target aerial vehicle with the filament element to neutralize the target aerial vehicle.

30. The method of claim 28, wherein the projectile comprises a liquid projectile comprising a liquid charge and a non-rigid flight integrity component comprising an additive combined with the liquid charge to inhibit substantial break-up of the liquid charge during flight, the liquid projectile configured to fluidly disperse in response to a predetermined event.

31. The method of claim 24, wherein the aerial vehicle countermeasure comprises an illumination device, wherein operating the aerial vehicle countermeasure further comprises emitting light with the illumination device at a predetermined frequency to disrupt operation of at least one sensor of the target aerial vehicle.

32. The method of claim 24, wherein the aerial vehicle countermeasure comprises at least one support member coupled to a flight body of the at least one counter-attack UAV, wherein operating the aerial vehicle countermeasure further comprises impacting the target aerial vehicle with the at least one support member.

33. The method of claim 24, wherein the aerial vehicle countermeasure comprises a cage device surrounding the at least one counter-attack UAV and comprising at least one support member extending from the cage device, wherein operating the aerial vehicle countermeasure further comprises impacting target aerial vehicle with the at least one support member to neutralize the target aerial vehicle.

34. The method of claim 24, further comprising transporting the at least one counter-attack UAV with a transport counter-attack UAV, and releasing the at least one counter-attack UAV from the transport counter-attack UAV to operate the at least one counter-attack UAV in-flight prior to neutralizing the target aerial vehicle.

35. The method of claim 24, further comprising actuating a release mechanism to release the aerial vehicle capture countermeasure and the captured target aerial vehicle at a particular location.

36. The method of claim 24, wherein detecting the target aerial vehicle further comprises operating an optical sensor and a radar sensor each supported by the at least one counter-attack UAV to detect a position of the target aerial vehicle.

37. The method of claim 24, wherein the plurality of detection sensors are associated with a ground structure, the method further comprising continuously communicating the position data to the at least one counter-attack UAV.

38. A tangible and non-transitory computer readable medium comprising one or more computer software modules configured to direct one or more processors to:
  receive position data generated by a plurality of detection sensors, the data associated with a target aerial vehicle;
  determine a position of the target aerial vehicle based on the received position data wherein the received position data associated with one or more detection sensors of the plurality of detection sensors is eliminated based on a credibility hierarchy associated with the plurality of detection sensors; and
  communicate command data associated with the determined position to at least one counter-attack unmanned aerial vehicle (UAV), wherein the command data comprises an instruction to deploy an aerial vehicle countermeasure.

39. The system of claim 1, wherein the at least one counter-attack UAV comprises a plurality of different aerial vehicle countermeasures, including the aerial vehicle countermeasure, supported by the flight body, wherein the aerial vehicle detection system comprises a CPU that is in communication with the plurality of detection sensors and that is operable to detect identification information about the target aerial vehicle, and wherein the command data comprises an instruction to deploy a type of aerial vehicle countermeasure of the plurality of different aerial vehicle countermeasures based at least in part on the detected identification information.

40. The system of claim 1, wherein the at least one counter-attack UAV comprises a plurality of counter-attack UAVs comprising a plurality of different aerial vehicle countermeasures, including the aerial vehicle countermeasure, wherein the aerial vehicle detection system comprises a CPU that is in communication with the plurality of detection sensors and that is operable to detect identification information about the target aerial vehicle, and wherein the command data comprises an instruction to deploy a type of aerial vehicle countermeasure of the plurality of different aerial vehicle countermeasures based at least in part on the detected identification information.

41. The method of claim 24, wherein the at least one counter-attack UAV comprises a plurality of different aerial vehicle countermeasures, including the aerial vehicle countermeasure, wherein the aerial vehicle detection system comprises a CPU that is in communication with the plurality of detection sensors and that is operable to detect identification information about the target aerial vehicle, and wherein the command data comprises an instruction to deploy a type of aerial vehicle countermeasure of the plurality of different aerial vehicle countermeasures based at least in part on the detected identification information.

42. The method of claim 24, wherein the at least one counter-attack UAV comprises a plurality of counter-attack UAVs comprising a plurality of different aerial vehicle countermeasures, including the aerial vehicle countermeasure, wherein the aerial vehicle detection system comprises a CPU that is in communication with the plurality of detection sensors and that is operable to detect identification information about the target aerial vehicle, and wherein the command data comprises an instruction to deploy a type of aerial vehicle countermeasure of the plurality of different aerial vehicle countermeasures based at least in part on the detected identification information.

43. The system of claim 1, wherein the credibility hierarchy is based on environmental conditions.

44. The system of claim 1, wherein the credibility hierarchy comprises a first prioritized list of sensors used in first environmental conditions and a second prioritized list of sensors used in second environmental conditions.

45. The system of claim 44, wherein the first environmental conditions comprise daylight conditions, and wherein the second environmental conditions comprise night conditions.

46. A system for detecting and neutralizing a target aerial vehicle, the system comprising:
a counter-attack unmanned aerial vehicle (UAV) comprising:
a flight body;
a flight control system that controls flight of the counter-attack UAV; and
an aerial vehicle countermeasure supported by the flight body, the aerial vehicle countermeasure comprising a plurality of tendrils operable to entangle rotors of the target aerial vehicle, the plurality of tendrils extending through an elongate cavity of an at least semi-rigid rod coupled to the counter-attack UAV to prevent the plurality of tendrils from accidentally tangling with the counter-attack UAV,
an aerial vehicle detection system comprising at least one detection sensor operable to detect a target aerial vehicle, and operable to provide command data to the counter-attack UAV to facilitate interception of the target aerial vehicle by the counter-attack UAV;
wherein, in response to interception of the target aerial vehicle, the counter-attack UAV disrupts operation of the detected target aerial vehicle with the aerial vehicle countermeasure.

47. The system of claim 46, wherein one or more weights are coupled to the plurality of tendrils.

48. A system for detecting and neutralizing a target aerial vehicle, the system comprising:
a counter-attack unmanned aerial vehicle (UAV) comprising:
a flight body;
a flight control system that controls flight of the counter-attack UAV; and
an aerial vehicle countermeasure supported by the flight body, the aerial vehicle countermeasure comprising at least one support member that is rigidly attached to the flight body, that extends outwardly from the at least one counter-attack UAV, and that is configured to impact the target aerial vehicle and neutralize the target aerial vehicle,
an aerial vehicle detection system comprising at least one detection sensor operable to detect a target aerial vehicle, and operable to provide command data to the counter-attack UAV to facilitate interception of the target aerial vehicle by the counter-attack UAV;
wherein, in response to interception of the target aerial vehicle, the counter-attack UAV disrupts operation of the detected target aerial vehicle with the aerial vehicle countermeasure.

49. The system of claim 48, wherein the aerial vehicle countermeasure comprises a cage device surrounding the at least one counter-attack UAV, wherein the at least one support member extends from the cage device.

50. The system of claim 48, wherein the at least one support member comprises a plurality of filament elements bound together by a breakable material in a solid state, whereby upon impact the breakable material breaks, thereby releasing the plurality of filament elements from each other to become entangled in a rotor of the target aerial vehicle.

51. A system for detecting and neutralizing a target aerial vehicle, the system comprising:
a transport counter-attack unmanned aerial vehicle (UAV) comprising a cage device;
a plurality of counter-attack UAVs comprising:
a flight body;
a flight control system that controls flight of the counter-attack UAV; and
an aerial vehicle countermeasure supported by the flight body,
wherein the plurality of counter-attack UAVs are removably coupled to the cage device, and
wherein, upon interception of the target aerial vehicle, at least one of the plurality of counter-attack UAVs is released from the transport counter-attack UAV to operate in flight to disrupt operation of the detected target aerial vehicle with the aerial vehicle countermeasure.

52. The system of claim 51, wherein the plurality of counter-attack UAVs are removeably coupled to the cage device by a breakable component wherein when the at least one of the plurality of counter-attack UAVs is released from the transport counter-attack UAV, the at least one of the plurality of counter-attack UAVs is activated to deploy or fly away from the cage device, thereby breaking the breakable component.

53. The system of claim 51, wherein the plurality of counter-attack UAVs are removeably coupled to the cage device by a release device wherein when the at least one of the plurality of counter-attack UAVs is released from the transport counter-attack UAV, the release device is actuated to release the at least one of the plurality of counter-attack UAVs from the cage device.

54. The system of claim 51, further comprising an aerial vehicle detection system comprising at least one detection sensor operable to detect the target aerial vehicle, and operable to provide command data to the transport counter-attack UAV and the plurality of counter-attack UAVs to facilitate interception of the target aerial vehicle by the transport counter-attack UAV and the plurality of counter-attack UAVs.

55. A system for detecting and neutralizing a target aerial vehicle, the system comprising:
a transport counter-attack unmanned aerial vehicle (UAV);
a counter-attack UAV comprising:

a flight body;

a flight control system that controls flight of the counter-attack UAV; and an aerial vehicle countermeasure supported by the flight body, wherein the counter-attack UAV is removably coupled to the transport counter-attack UAV by a tether, and wherein, upon interception of the target aerial vehicle, the counter-attack UAV is released from the transport counter-attack UAV to operate in flight to disrupt operation of the detected target aerial vehicle with the aerial vehicle countermeasure.

56. The system of claim 55, wherein the counter-attack UAV is removeably coupled to the tether via a cage device surrounding counter-attack UAV.

57. The system of claim 55, further comprising an aerial vehicle detection system comprising at least one detection sensor operable to detect the target aerial vehicle, and operable to provide command data to the transport counter-attack UAV and the counter-attack UAV to facilitate interception of the target aerial vehicle by the transport counter-attack UAV and the counter-attack UAV.

58. A system for detecting and neutralizing a target aerial vehicle, the system comprising:

an aerial vehicle detection system comprising a plurality of detection sensors operable to detect the target aerial vehicle and to generate position data associated with the target aerial vehicle, the aerial vehicle detection system being operable to eliminate the generated position data associated with one or more detection sensors of the plurality of detection sensors based on a credibility hierarchy associated with the plurality of detection sensors and operable to provide command data to at least one counter-attack UAV to facilitate interception of the target aerial vehicle by the at least one counter-attack UAV, wherein the command data comprises position data based on the credibility hierarchy.

* * * * *